United States Patent
Yamauchi et al.

(10) Patent No.: US 10,505,191 B2
(45) Date of Patent: Dec. 10, 2019

(54) MANGANESE-COBALT COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Mitsuru Yamauchi, Ehime (JP); Kazuomi Ryoshi, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 207 days.

(21) Appl. No.: 15/322,278

(22) PCT Filed: Apr. 24, 2015

(86) PCT No.: PCT/JP2015/062531
§ 371 (c)(1),
(2) Date: Dec. 27, 2016

(87) PCT Pub. No.: WO2015/198710
PCT Pub. Date: Dec. 30, 2015

(65) Prior Publication Data
US 2017/0155144 A1 Jun. 1, 2017

(30) Foreign Application Priority Data
Jun. 27, 2014 (JP) .................................. 2014-133399

(51) Int. Cl.
*H01M 4/525* (2010.01)
*C01G 53/00* (2006.01)
(Continued)

(52) U.S. Cl.
CPC ............ *H01M 4/525* (2013.01); *C01G 51/00* (2013.01); *C01G 51/50* (2013.01); *C01G 53/00* (2013.01);
(Continued)

(58) Field of Classification Search
CPC .... H01M 4/525; H01M 4/041; H01M 4/1391; H01M 4/364; H01M 4/131;
(Continued)

(56) References Cited

U.S. PATENT DOCUMENTS 6,241,959 B1 6/2001 Cho et al.
6,306,787 B1 10/2001 Sato et al.
(Continued)

FOREIGN PATENT DOCUMENTS

JP H11-1324 A 1/1999
JP H11-60246 A 3/1999
(Continued)

OTHER PUBLICATIONS

Yamauchi, Mitsuru et al. Effect of morphology control of Li(Ni,Mn,Co)O2 on crystal structure and Battery Characteristics, Ceramic Socient of Japan, 2014 Annual Lecture Proceedings, Mar. 7, 2014 (Year: 2014).*

(Continued)

*Primary Examiner* — Gary D Harris
(74) *Attorney, Agent, or Firm* — Oliff PLC

(57) ABSTRACT

A positive electrode active material for non-aqueous electrolyte secondary batteries that can achieve a high output characteristic and a high battery capacity when used in a positive electrode of a battery and that can achieve a high electrode density, and a non-aqueous electrolyte secondary battery that uses such a positive electrode active material and can achieve a high capacity and a high output. A lithium-manganese-cobalt composite oxide includes plate-
(Continued)

shaped secondary particles each obtained by aggregation of a plurality of plate-shaped primary particles caused by overlapping of plate surfaces of the plate-shaped primary particles, wherein a shape of the primary particles is any one of a spherical, elliptical, oval, or a planar projected shape of a block-shaped object, and the secondary particles have an aspect ratio of 3 to 20 and a volume-average particle size (Mv) of 4 μm to 20 μm as measured by a laser diffraction scattering process.

7 Claims, 5 Drawing Sheets

(51) Int. Cl.
H01M 4/505 (2010.01)
H01M 4/04 (2006.01)
H01M 4/131 (2010.01)
H01M 10/0525 (2010.01)
C01G 51/00 (2006.01)
H01M 4/1391 (2010.01)
H01M 4/36 (2006.01)
H01M 4/02 (2006.01)
H01M 10/052 (2010.01)

(52) U.S. Cl.
CPC ............ *C01G 53/40* (2013.01); *C01G 53/50* (2013.01); *H01M 4/0471* (2013.01); *H01M 4/131* (2013.01); *H01M 4/1391* (2013.01); *H01M 4/364* (2013.01); *H01M 4/505* (2013.01); *H01M 10/0525* (2013.01); *C01P 2002/50* (2013.01); *C01P 2004/03* (2013.01); *C01P 2004/20* (2013.01); *C01P 2004/45* (2013.01); *C01P 2004/51* (2013.01); *C01P 2004/54* (2013.01); *C01P 2004/61* (2013.01); *C01P 2006/40* (2013.01); *H01M 10/052* (2013.01); *H01M 2004/021* (2013.01); *H01M 2004/028* (2013.01)

(58) Field of Classification Search
CPC ............ H01M 10/0525; H01M 4/505; H01M 10/052; H01M 2004/021; H01M 2004/028; C01G 51/50; C01G 53/40; C01G 53/50; C01G 51/00; C01G 53/00; C01P 2004/03; C01P 2004/20; C01P 2006/40; C01P 2002/50; C01P 2004/54; C01P 2004/51; C01P 2004/45; C01P 2004/61
USPC ............................................. 429/223
See application file for complete search history.

(56) References Cited

U.S. PATENT DOCUMENTS

2001/0028874 A1 10/2001 Cho et al.
2014/0087263 A1 3/2014 Matsumoto et al.
2014/0186710 A1 7/2014 Ryoshi et al.

FOREIGN PATENT DOCUMENTS

| JP | H11-246225 A | 9/1999 |
| JP | 2003-178756 A | 6/2003 |
| JP | 2012-084502 A | 4/2012 |
| JP | 2014-129188 A | 7/2014 |
| WO | 2012/165654 A1 | 12/2012 |
| WO | 2014/061399 A1 | 4/2014 |

OTHER PUBLICATIONS

Jun. 16, 2015 Search Report issued in International Patent Application No. PCT/JP2015/062531.
Yamauchi et al; "Li (Ni, Mn, Co)O2 no Keitai Seigyo ni yoru Kessho Kozo-Denchi Tokusei eno Eikyo;" The Ceramic Society of Japan 2014 Nenkai Koen Yokoshu (CD-ROM); Mar. 7, 2014.

* cited by examiner

MANGANESE-COBALT COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

BACKGROUND OF THE INVENTION

Field of the Invention

The present invention relates to a manganese-cobalt composite hydroxide and a process for producing the same, a positive electrode active material and a process for producing the same, and a non-aqueous electrolyte secondary battery. More specifically, the present invention relates to a manganese-cobalt composite hydroxide as a precursor of a lithium-manganese-cobalt composite oxide for use as a positive electrode active material in a non-aqueous electrolyte secondary battery such as a lithium-ion secondary battery and a process for producing the same, a positive electrode active material and a process for producing the same with the use of the manganese-cobalt composite hydroxide as a precursor, and a non-aqueous electrolyte secondary battery using the positive electrode active material. It is to be noted that this application claims priority based on Japanese Patent Application No. 2014-133399 filed in Japan on Jun. 27, 2014.

Description of Related Art

In recent years, there has been a strong demand for development of a small and lightweight secondary battery having a high energy density because of the widespread use of mobile phones and portable devices such as laptop computers. Examples of such a secondary battery include lithium-ion secondary batteries using, as a negative electrode, lithium, a lithium alloy, a metal oxide, or carbon, and such lithium-ion secondary batteries have been actively researched and developed.

A lithium-ion secondary battery using, as a positive electrode active material, a lithium-metal composite oxide, especially a lithium-cobalt composite oxide, can achieve a 4 V-class high voltage, and is therefore expected to serve as a battery having a high energy density. For this reason, the commercialization of such a lithium-ion secondary battery has been accelerated. Many attempts have hitherto been made to develop a battery using a lithium-cobalt composite oxide to achieve excellent initial capacity characteristic and cycle characteristic, and as a result, various results have already been obtained.

Major examples of a positive electrode active material that have hitherto been proposed include a lithium-cobalt composite oxide ($LiCoO_2$) that is relatively easily synthesized, a lithium-nickel composite oxide ($LiNiO_2$) or a lithium-nickel-cobalt-manganese composite oxide ($LiNi_{1/3}Co_{1/3}Mn_{1/3}O_2$) using nickel cheaper than cobalt, and a lithium-manganese composite oxide ($LiMn_2O_4$) using manganese, and spherical or almost spherical particles thereof, which are easily synthesized, are mainly used.

The main characteristics of a battery using such a positive electrode active material are a capacity and a power density. Particularly, a battery for hybrid cars, whose demand has significantly increased in recent years, is required to have a high power density.

The power density of a secondary battery can be increased by, for example, reducing the thickness of an electrode film used in the battery. For example, a battery for hybrid cars uses an electrode film having a thickness of about 50 μm. This is because the migration distance of lithium ions in the battery for hybrid cars can be reduced by reducing the thickness of the electrode film. A positive electrode active material for use in such a thin electrode film may penetrate the electrode film, and is therefore limited to small-diameter particles having a uniform particle size. In the case of an electrode film of a battery for hybrid cars, particles having a particle size of about 5 μm are used.

However, the use of such small-diameter particles in an electrode film has a drawback that an electrode density is reduced so that a volume energy density is reduced which is an important characteristic in addition to a power density.

Patent Document 1: JP 2012-84502 A

SUMMARY OF THE INVENTION

The way to overcome such a trade-off is, for example, to change the shape of positive electrode active material particles that are generally spherical or almost spherical, more specifically, to form positive electrode active material particles into a plate shape. By forming positive electrode active material particles into a plate shape, the surface area of the positive electrode active material particles is increased as compared to that of spherical particles having the same volume. Further, a high electrode density can be achieved by orienting the plate-shaped particles when an electrode is formed Further, the orientation of such particles having a high aspect ratio makes it possible to further reduce the thickness of the electrode, thereby further improving the output of a battery.

As such a plate-shaped positive electrode active material particle, for example, Patent Literature 1 discloses a plate-shaped particle for a positive electrode active material, wherein when t represents a thickness (μm) of the particle, d represents a particle size as a size in a direction orthogonal to a thickness direction defining the thickness t, and d/t represents an aspect ratio, $t \leq 30$ and $d/t \geq 2$, and wherein primary crystal particles (lithium-intercalation/deintercalation-plane-oriented particles) whose (003) plane is oriented so as to intersect a plate surface of the plate-shaped particle are placed in a dispersed state in an aggregate of primary crystal particles (numerous (003)-plane-oriented particles) whose (003) plane is oriented so as to be parallel to the plate surface of the plate-shaped particle.

However, even when the lithium intercalation/deintercalation plane is oriented to the outside of the secondary particle as described in Patent Document 1, an output characteristic is adversely affected when the positive electrode active material and an electrolyte do not sufficiently come in contact with each other. Further, Patent Document 1 describes a rate characteristic, but does not describe a battery capacity itself that is an important characteristic of a battery.

As described above, it is difficult for the conventional techniques to industrially achieve a positive electrode active material that can form a thin electrode film having a high electrode density and that can achieve a high capacity and an excellent output characteristic.

In the light of such a problem, it is an object of the present invention to provide a positive electrode active material for non-aqueous electrolyte secondary batteries that can form a thin electrode film, can achieve a high output characteristic and a high battery capacity when used in a positive electrode of a battery, and can achieve a high electrode density, and a non-aqueous electrolyte secondary battery that uses such a positive electrode active material and can achieve a high capacity and a high output.

It is also an object of the present invention to provide a manganese-cobalt composite hydroxide that is a precursor of a positive electrode active material and that makes it possible to provide the above-described positive electrode active material for non-aqueous electrolyte secondary batteries.

The present inventors have intensively studied a positive electrode active material for non-aqueous electrolyte secondary batteries that has a shape capable of achieving a high electrode density and a manganese-cobalt composite hydroxide as a precursor of such a positive electrode active material. As a result, the present inventors have found that a plate-shaped secondary particle can be obtained by aggregation of a plurality of plate-shaped primary particles caused by overlapping of plate surfaces of the plate-shaped primary particles due to the control of the composition of a manganese-cobalt composite hydroxide during crystallization and crystallization conditions.

Further, the present inventors have found that a positive electrode active material whose shape is derived from the shape of the manganese-cobalt composite hydroxide can be obtained by calcining a mixture of the manganese-cobalt composite hydroxide and a lithium compound and that a high output characteristic, a high battery capacity, and a high electrode density can simultaneously be achieved. These findings have led to the completion of the present invention.

More specifically, in order to achieve the above objects, the present invention is directed to a manganese-cobalt composite hydroxide represented by $Ni_xCo_yMn_zM_t(OH)_{2+A}$ (wherein x satisfies $0 \leq x \leq 0.5$, y satisfies $0 < y \leq 0.5$, z satisfies $0.35 < z < 0.8$, t satisfies $0 \leq t \leq 0.1$, A satisfies $0 \leq A \leq 0.5$, x, y, z, and t satisfy $x+y+z+t=1$, and M is at least one additive element selected from V, Mg, Al, Ti, Mo, Nb, Zr, and W), including plate-shaped secondary particles each obtained by aggregation of a plurality of plate-shaped primary particles caused by overlapping of plate surfaces of the plate-shaped primary particles, wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method.

The manganese-cobalt composite hydroxide preferably has a particle size variation index represented by [(D90–D10)/Mv] of 0.70 or less, which is calculated from D90 and D10 of a particle size distribution determined by a laser diffraction scattering method and the volume-average particle size (Mv).

Further, in the manganese-cobalt composite hydroxide, an average of maximum diameters of the plate-shaped primary particles projected in a direction perpendicular to plate surfaces of the secondary particles is preferably 1 μm to 5 μm.

Further, in the manganese-cobalt composite hydroxide, at least a cobalt concentration layer is provided inside the plate-shaped primary particles, and the concentration layer preferably has a thickness of 0.01 μm to 1 μm.

The present invention is also directed to a process for producing a manganese-cobalt composite hydroxide represented by $Ni_xCo_yMn_zM_t(OH)_{2+A}$ (wherein x satisfies $0 \leq x \leq 0.5$, y satisfies $0 < y \leq 0.5$, z satisfies $0.35 < z < 0.8$, t satisfies $0 \leq t \leq 0.1$, A satisfies $0 \leq A \leq 0.5$, x, y, z, and t satisfy $x+y+z+t=1$, and M is at least one additive element selected from V, Mg, Al, Ti, Mo, Nb, Zr, and W), the process including: a nucleation step in which an aqueous solution for nucleation that contains a cobalt-containing metal compound so that a content of cobalt to all metal elements contained therein is 90 atom % or more is adjusted to a pH of 12.5 or more on the basis of a liquid temperature of 25° C. to form plate-shaped crystal nuclei; and a particle growth step in which a slurry for particle growth containing the plate-shaped crystal nuclei formed in the nucleation step is adjusted to a pH of 10.5 to 12.5 on the basis of a liquid temperature of 25° C. but less than the pH in the nucleation step, and a mixed aqueous solution containing a metal compound containing at least manganese is supplied to the slurry for particle growth to grow the plate-shaped crystal nuclei.

In the process for producing a manganese-cobalt composite hydroxide, nucleation in the nucleation step is preferably performed in a non-oxidizing atmosphere whose oxygen concentration is 5 vol % or less, and an ammonia concentration of the slurry for particle growth is preferably adjusted to 5 g/L to 20 g/L in the particle growth step.

Further, in the process for producing a manganese-cobalt composite hydroxide, the slurry for particle growth is preferably one obtained by adjusting a pH of a plate-shaped crystal nuclei-containing slurry containing the plate-shaped crystal nuclei obtained in the nucleation step.

The present invention is also directed to a positive electrode active material for non-aqueous electrolyte secondary batteries including a lithium-manganese-cobalt composite oxide represented by $Li_{1+u}Ni_xCo_yMn_zM_tO_{2+\alpha}$ (wherein u satisfies $-0.05 \leq u < 0.60$, x satisfies $0 \leq x \leq 0.5$, y satisfies $0 < y \leq 0.5$, z satisfies $0.35 < z < 0.8$, t satisfies $0 \leq t \leq 0.1$, α satisfies $0 \leq \alpha < 0.6$, x, y, z, and t satisfy $x+y+z+t=1$, and M is at least one additive element selected from V, Mg, Al, Ti, Mo, Nb, Zr, and W) and having a hexagonal layered structure, wherein the lithium-manganese-cobalt composite oxide includes plate-shaped secondary particles each obtained by aggregation of a plurality of plate-shaped primary particles caused by overlapping of plate surfaces of the plate-shaped primary particles, a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method.

The positive electrode active material for non-aqueous electrolyte secondary batteries preferably has a particle size variation index represented by [(D90–D10)/Mv] of 0.75 or less, which is calculated from D90 and D10 of a particle size distribution determined by a laser diffraction scattering method and the volume-average particle size (Mv).

Further, in the positive electrode active material for non-aqueous electrolyte secondary batteries, the lithium-manganese-cobalt composite oxide is preferably one represented by $Li_{1+u}Ni_xCo_yMn_zM_tO_{2+\alpha}$ (wherein u satisfies $0.40 \leq u < 0.60$, satisfies $z-x \leq u$ when $z-x > 0.4$, and satisfies $u \leq z$ when $z < 0.6$, x satisfies $0 \leq x \leq 0.5$, y satisfies $0 < y \leq 0.5$, z satisfies $0.5 \leq z < 0.8$, α satisfies $0.4 \leq \alpha < 0.6$, z and x satisfy $z-x < 0.6$, x, y, z, and t satisfy $x+y+z+t=1$, and M is at least one additive element selected from V, Mg, Al, Ti, Mo, Nb, Zr, and W).

Further, the positive electrode active material for non-aqueous electrolyte secondary batteries preferably includes a hexagonal compound represented by a general formula $LiMeO_2$ and a monoclinic compound represented by a general formula $Li_2Me'O_3$, wherein Me and Me' each represent a metal element other than Li.

Further, in the positive electrode active material for non-aqueous electrolyte secondary batteries, a site occupancy of ions of a metal other than lithium in a 3a site determined by Rietveld analysis of a peak corresponding to the hexagonal lithium-manganese-cobalt composite oxide in X-ray diffraction is preferably 3% or less, or an orientation index of a (003) plane corresponding to the hexagonal lithium-manganese-cobalt composite oxide determined by X-ray diffraction analysis is preferably 0.9 to 1.1.

The present invention is also directed to a process for producing a positive electrode active material for non-aqueous electrolyte secondary batteries including a lithium-manganese-cobalt composite oxide represented by $Li_{1+u}Ni_xCo_yMn_zM_tO_{2+\alpha}$ (wherein u satisfies $-0.05 \le u < 0.60$, x satisfies $0 \le x \le 0.5$, y satisfies $0 < y \le 0.5$, z satisfies $0.35 < z < 0.8$, t satisfies $0 \le t \le 0.1$, $\alpha$ satisfies $0 \le \alpha < 0.6$, x, y, z, and t satisfy $x+y+z+t=1$, and M is at least one additive element selected from V, Mg, Al, Ti, Mo, Nb, Zr, and W) and having a hexagonal layered structure, the process including: a mixing step in which a manganese-cobalt composite hydroxide and a lithium compound are mixed to form a lithium mixture; and a calcining step in which the lithium mixture is calcined at a temperature of 650° C. to 1000° C. in an oxidizing atmosphere.

In the process for producing a positive electrode active material for non-aqueous electrolyte secondary batteries, a ratio (Li/ME) of a number of lithium atoms (Li) to a sum of numbers of metal atoms other than lithium (ME) contained in the lithium mixture is preferably 0.95 to 1.6.

Further, the process for producing a positive electrode active material for non-aqueous electrolyte secondary batteries preferably further includes, before the mixing step, a heat treatment step in which the manganese-cobalt composite hydroxide is heat-treated at a temperature of 300° C. to 750° C. in a non-reducing atmosphere.

Further, in the process for producing a positive electrode active material for non-aqueous electrolyte secondary batteries, the oxidizing atmosphere in the calcining step is preferably an atmosphere containing 18 vol % to 100 vol % of oxygen.

The present invention is also directed to a non-aqueous electrolyte secondary battery including: a positive electrode; a negative electrode; a non-aqueous electrolyte; and a separator, wherein the positive electrode is made of the above-described positive electrode active material for non-aqueous electrolyte secondary batteries.

According to the present invention, it is possible to obtain a manganese-cobalt composite hydroxide suitable as a precursor of a positive electrode active material for non-aqueous electrolyte secondary batteries.

According to the present invention, when the manganese-cobalt composite hydroxide is used as a precursor of a positive electrode active material for non-aqueous electrolyte secondary batteries, it is possible to obtain a positive electrode active material that can achieve a high output characteristic, a high battery capacity, and a high electrode density.

According to the present invention, when the positive electrode active material is applied to a non-aqueous electrolyte secondary battery, it is possible to form a thin electrode film and therefore to obtain a non-aqueous electrolyte secondary battery that simultaneously achieves a high output characteristic and a high battery capacity.

DETAILED DESCRIPTION OF THE INVENTION

Figure 1:
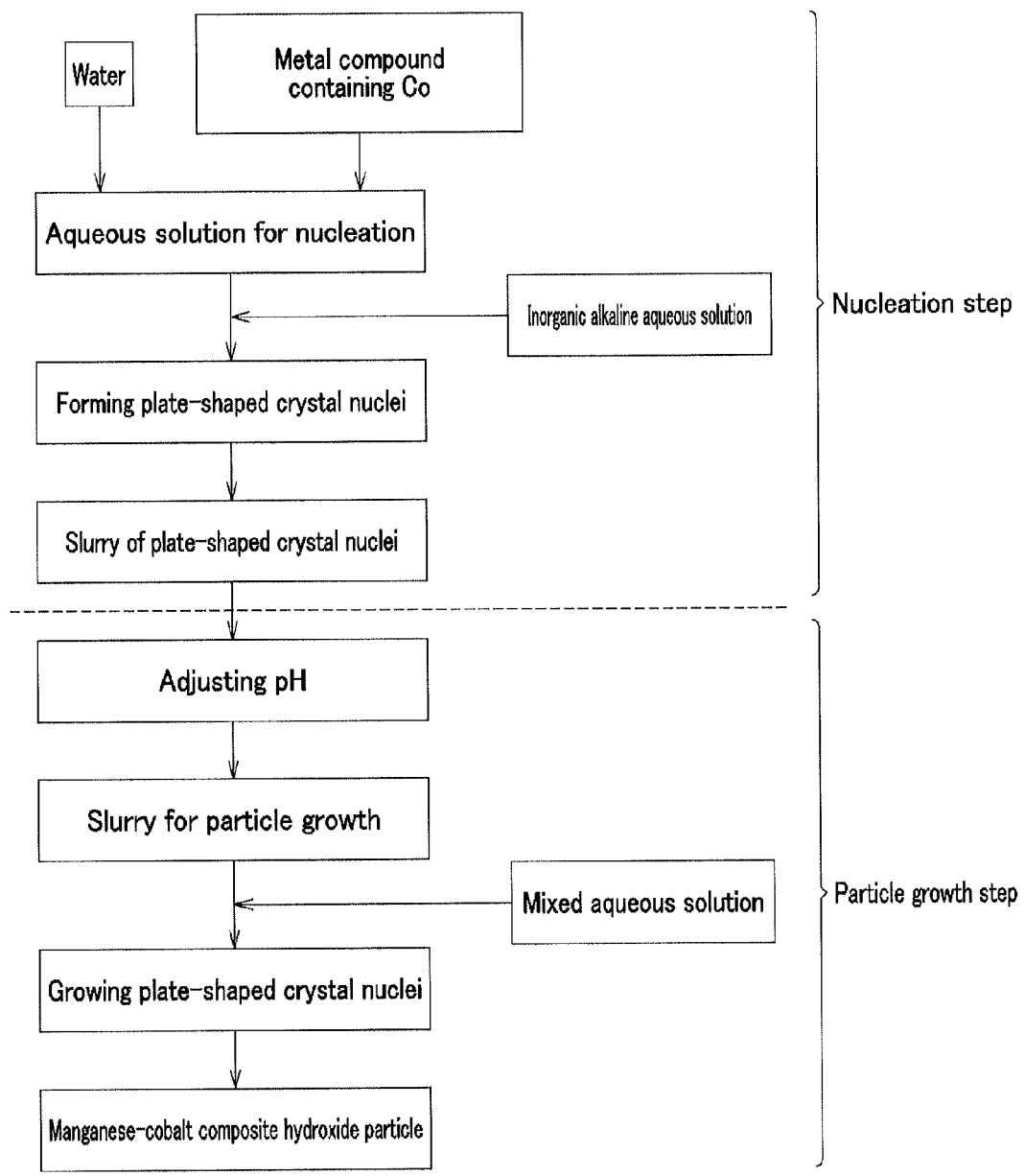
FIG. 1 is a flowchart that illustrates a process for producing a manganese-cobalt composite hydroxide according to the present invention.

Specific embodiments according to the present invention (hereinafter, referred to as "embodiments of the present invention") will be described in detail in the following order with reference to the drawings. It is to be noted that the present invention is not limited to the following embodiments, and various changes may be made thereto without departing from the scope of the present invention.

[1] Manganese-cobalt composite hydroxide and process for producing the same

[2] Positive electrode active material for non-aqueous electrolyte secondary batteries and process for producing the same

[3] Non-aqueous electrolyte secondary battery

[1] Manganese-Cobalt Composite Hydroxide and Process for Producing the Same

<1-1> Manganese-Cobalt Composite Hydroxide

A manganese-cobalt composite hydroxide according to an embodiment of the present invention includes plate-shaped secondary particles each obtained by aggregation of a plurality of plate-shaped primary particles caused by overlapping of plate surfaces of the plate-shaped primary particles, wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 µm to 20 µm as measured by a laser diffraction scattering method.

The present inventors have studied the filling density of a positive electrode active material in a positive electrode and the area of contact with an electrolytic solution, and as a result have found that the use of a positive electrode active material including plate-shaped secondary particles each obtained by aggregation of plate-shaped primary particles caused by overlapping of plate surfaces of the plate-shaped primary particles makes it possible to simultaneously achieve an improvement in filling density and an increase in the area of contact with an electrolytic solution. More specifically, the present inventors have found that the use of plate-shaped secondary particles each obtained by aggregation of plate-shaped primary particles, whose projected shape in a direction perpendicular to plate surfaces thereof is any one of a spherical shape, an elliptical shape, an oval shape, and a planar projected shape of a block-shaped object, caused by overlapping of the plate surfaces of the plate-shaped primary particles makes it possible to simultaneously obtain the effect of allowing a sufficient amount of electrolytic solution to enter into the secondary particles, the effect of increasing the area of contact with an electrolytic solution, and the effect of improving a filling density due to the use of plate-shaped particles.

(Shape and Structure of Particles)

The manganese-cobalt composite hydroxide includes plate-shaped secondary particles each obtained by aggregation of a plurality of plate-shaped primary particles caused by overlapping of plate surfaces of the plate-shaped primary particles, and further, a shape of the plate-shaped primary particles projected in a direction perpendicular to the plate surfaces thereof is any one of a spherical shape, an elliptical shape, an oval shape, and a planar projected shape of a block-shaped object. Here, the plate surface refers to a surface perpendicular to a projection direction in which the projected area of the particle is maximized. Further, the overlapped plate surfaces may be inclined from a direction in which the plate surfaces are parallel to one another so that the plate-shaped primary particles can be easily aggregated together.

The shape of positive electrode active material particles is derived from the shape of manganese-cobalt composite hydroxide particles as a precursor thereof (hereinafter, also referred to as "precursor particles"). Therefore, positive electrode active material particles whose shape has the same features as the shape of the precursor particles can be obtained by controlling the shape of the precursor particles so that plate-shaped secondary particles can be obtained by aggregation of plate-shaped primary particles caused by overlapping of plate surfaces of the plate-shaped primary particles. It is to be noted that when conventional small-diameter or plate-shaped precursor particles are used, positive electrode active material particles whose shape is derived from the shape of the conventional precursor particles are obtained, and therefore a positive electrode active material that will be described later cannot be obtained.

Further, the secondary particles have an aspect ratio of 3 to 20, preferably 4.5 to 20, more preferably 5 to 15, even more preferably 5 to 12, and the volume-average particle size (Mv) of the manganese-cobalt composite hydroxide as measured by a laser diffraction scattering method is 4 μm to 20 μm. Further, in the manganese-cobalt composite hydroxide, an average of maximum diameters of the plate-shaped primary particles projected in a direction perpendicular to the plate surfaces thereof (R1) (maximum diameters of the plate-shaped primary particles projected in a direction perpendicular to the plate surfaces of the secondary particles) is preferably 1 μm to 5 μm. If the aspect ratio and Mv that specify the shape of the manganese-cobalt composite hydroxide (hereinafter, they are referred to as "shape-specifying values") exceed their respective ranges, the shape-specifying values of the resulting positive electrode active material may also deviate from their respective ranges. Therefore, it is impossible to obtain such an effect of achieving a high output characteristic, a high battery capacity, and a high electrode density as will be described later. Therefore, the shape-specifying values (aspect ratio and Mv) of the manganese-cobalt composite hydroxide need to fall within their respective ranges. Further, in order to achieve a higher output characteristic and a higher battery capacity, R1 is preferably within the above range.

Here, the aspect ratio refers to a ratio (R2/t) of an average of maximum diameters of the secondary particles projected in a direction perpendicular to the plate surfaces thereof (R2) to an average of maximum thicknesses of the secondary particles in a direction perpendicular to the plate surfaces thereof (t). The average of maximum thicknesses (t) is determined by randomly selecting 20 or more of the secondary particles observable in a direction parallel to the plate surfaces thereof by external observation with a scanning electron microscope and measuring and averaging the maximum thicknesses of the secondary particles. Further, the average of maximum diameters (R2) is determined by randomly selecting 20 or more of the secondary particles observable in a direction perpendicular to the plate surfaces thereof by external observation with a scanning electron microscope and measuring and averaging the maximum diameters of the secondary particles. Then, R2/t is determined from the thus determined average of maximum thicknesses (t) and average of maximum diameters (R2) and is defined as an aspect ratio of the secondary particles. Further, the average of maximum diameters of the plate-shaped primary particles (R1) is determined by randomly selecting 50 or more of the primary particles whose entire shape is observable in a direction perpendicular to the plate surfaces thereof and measuring and averaging the maximum diameters of the primary particles in the same manner as in the case of R2.

Since the manganese-cobalt composite hydroxide includes plate-shaped secondary particles each obtained by aggregation of a plurality of plate-shaped primary particles caused by overlapping of plate surfaces of the plate-shaped primary particles, voids are sufficiently present in the secondary particles. Particularly, since the shape of the plate-shaped primary particles projected in a direction perpendicular to the plate surfaces thereof is any one of a spherical shape, an elliptical shape, an oval shape, and a planar projected shape of a block-shaped object, the secondary particles have a structure in which voids are sufficiently present also in planes parallel to the plate surfaces thereof. Therefore, when the manganese-cobalt composite hydroxide and a lithium compound are mixed and calcined to produce a positive electrode active material, the molten lithium compound spreads into the secondary particles so that lithium is sufficiently diffused, which makes it possible to obtain a positive electrode active material having excellent crystallinity. On the other hand, in the case of plate-shaped secondary particles formed as polycrystals of primary particles, voids are not sufficiently present between the primary particles, and therefore the molten lithium compound does not sufficiently spread into the secondary particles. The voids inside the secondary particles constituting the manganese-cobalt composite hydroxide remain even after production of a positive electrode active material, and therefore an electrolyte can sufficiently spread into secondary particles constituting the positive electrode active material.

Further, when the manganese-cobalt composite hydroxide is produced by a process for producing a manganese-cobalt composite hydroxide that will be described later, the primary particles have a cobalt concentration layer inside thereof. The secondary particles are formed by growing plate-shaped crystal nuclei formed from a cobalt-containing metal compound. Therefore, the primary particles of the resulting manganese-cobalt composite hydroxide have a high concentration layer of cobalt derived from the plate-shaped crystal nucleus inside thereof. When the plate-shaped crystal nuclei are grown to the extent that the high concentration layers are formed, primary particles are grown to have a desired shape, and further plate-shaped secondary particles are formed by aggregation of the primary particles caused by overlapping of plate surfaces of the primary particles. On the other hand, when the high concentration layer is not present, that is, when the plate-shaped crystal nuclei are not sufficiently grown, there is a case where the resulting secondary particles do not have a desired shape. However, as long as being strong enough not to be broken during particle growth and having a shape similar to that of plate-shaped crystal nuclei, plate-shaped particles can be used as plate-shaped crystal nuclei so as to be grown to primary particles to form secondary particles. Therefore, when plate-shaped particles having desired composition and shape are separately prepared, a manganese-cobalt composite hydroxide having no high concentration layer is obtained.

In order to grow the primary particles to allow the secondary particles to have a satisfactory shape, the thickness of the high concentration layer is preferably 0.01 μm to 1 μm. If the thickness is less than 0.01 μm, there is a case where the plate-shaped crystal nuclei are broken during nucleation or particle growth, and therefore the primary particles are not sufficiently grown. On the other hand, if the thickness exceeds 1 μm, there is a case where the resulting particles of the positive electrode active material have a nonuniform composition or the grown primary particles do not have a plate shape.

The plate-shaped primary particles having a high aspect ratio can be obtained by growing crystals on both surfaces of each of the plate-shaped crystal nuclei. That is, the primary particles preferably have the high concentration layer in the center of the thickness direction thereof.

(Composition)

The manganese-cobalt composite hydroxide according to the embodiment of the present invention has a composition represented by a general formula (1): $Ni_xCo_yMn_zM_t(OH)_{2+A}$ (wherein x satisfies $0 \leq x \leq 0.5$, y satisfies $0 < y \leq 0.5$, z satisfies $0.35 < z < 0.8$, t satisfies $0 \leq t \leq 0.1$, A satisfies $0 \leq A \leq 0.5$, x, y, z, and t satisfy $x+y+z+t=1$, and M is at least one additive element selected from V, Mg, Al, Ti, Mo, Nb, Zr, and W).

As described above, the manganese-cobalt composite hydroxide contains at least cobalt. In the general formula (1), y representing a cobalt content satisfies $0 < y \leq 0.50$, but in order to sufficiently grow the plate-shaped crystal nuclei, y preferably satisfies $0.05 \leq y \leq 0.50$, and more preferably satisfies $0.1 \leq y \leq 0.50$.

When a positive electrode active material is obtained using the above-described manganese-cobalt composite hydroxide as a raw material, the composition ratio of this composite hydroxide (Ni:Co:Mn:M) is maintained also in the resulting positive electrode active material. Therefore, the composition ratio of the manganese-cobalt composite hydroxide particles is set to be the same as a desired composition ratio of a positive electrode active material to be obtained. When the manganese-cobalt composite hydroxide has a composition represented by the general formula (1), a battery using the resulting positive electrode active material for non-aqueous electrolyte secondary batteries can deliver excellent battery performance.

(Particle Size Distribution)

The manganese-cobalt composite hydroxide preferably has a particle size variation index represented by [(D90−D10)/Mv] of 0.70 or less, which is calculated from D90 and D10 of a particle size distribution determined by a laser diffraction scattering method and the volume-average particle size (Mv).

The particle size distribution of a positive electrode active material is greatly influenced by the manganese-cobalt composite hydroxide as a precursor, and therefore when the manganese-cobalt composite hydroxide contains fine particles or coarse particles, the resulting positive electrode active material also contains such particles. That is, if the manganese-cobalt composite hydroxide has a variation index exceeding 0.70 and therefore has a wide particle size distribution, the resulting positive electrode active material may also contain fine particles or coarse particles.

Therefore, when the variation index of the manganese-cobalt composite hydroxide is set to 0.70 or less, the variation index of the resulting positive electrode active material can be made small and a cycle characteristic or an output characteristic can be improved. By reducing the variation index, the characteristics of the positive electrode active material can be improved. However, it is difficult to completely prevent variations in particle size, and therefore the lower limit of the variation index is practically about 0.30.

In [(D90−D10)/Mv] representing the particle size variation index, D10 refers to a particle size such that, when the number of particles of each particle size is cumulatively counted, particles whose cumulative volume is 10% of the total volume of all the particles have a particle size smaller than this size. Further, D90 refers to a particle size such that, when the number of particles is cumulatively counted in the same manner as above, particles whose cumulative volume is 90% of the total volume of all the particles have a particle size smaller than this size. The volume-average particle size Mv, D90, and D10 can be measured using a laser diffraction scattering type particle size analyzer.

As described above, the manganese-cobalt composite hydroxide includes plate-shaped secondary particles each obtained by aggregation of a plurality of plate-shaped primary particles caused by overlapping of plate surfaces of the plate-shaped primary particles, wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method.

Such a manganese-cobalt composite hydroxide is suitable as a precursor of a positive electrode active material for non-aqueous electrolyte secondary batteries. More specifically, the manganese-cobalt composite hydroxide has the above-described features, and therefore when the manganese-cobalt composite hydroxide is used as a precursor of a positive electrode active material, it is possible to obtain a positive electrode active material that has an increased area of contact with an electrolytic solution and achieves a high filling density. As a result, the manganese-cobalt composite hydroxide can provide a positive electrode active material for non-aqueous electrolyte secondary batteries, which can form a thin electrode film and can achieve a high output characteristic, a high battery capacity, and a high electrode density.

<1-2> Process for Producing Manganese-Cobalt Composite Hydroxide

A process for producing a manganese-cobalt composite hydroxide according to the present invention is intended to produce a manganese-cobalt composite hydroxide represented by the following general formula (1) by a crystallization reaction: $Ni_xCo_yMn_zM_t(OH)_{2+A}$ (wherein x satisfies $0 \leq x \leq 0.5$, y satisfies $0 < y \leq 0.5$, z satisfies $0.35 < z < 0.8$, t satisfies $0 \leq t \leq 0.1$, A satisfies $0 \leq A \leq 0.5$, x, y, z, and t satisfy $x+y+z+t=1$, and M is at least one additive element selected from V, Mg, Al, Ti, Mo, Nb, Zr, and W).

<1-2-1> Nucleation Step and Particle Growth Step

As shown in FIG. 1, the process for producing a manganese-cobalt composite hydroxide includes: a nucleation step in which plate-shaped crystal nuclei are formed from an aqueous solution for nucleation that contains a cobalt-containing metal compound so that a content of cobalt to all metal elements contained therein is 90 atom % or more; and a particle growth step in which the plate-shaped crystal nuclei formed in the nucleation step are grown.

Here, in a conventional crystallization process, a nucleation reaction and a particle growth reaction are allowed to simultaneously proceed in the same vessel. Therefore, in the conventional crystallization process, the resulting composite hydroxide particles are isotropically grown, which makes it difficult to control the shape of the particles.

On the other hand, in the process for producing a manganese-cobalt composite hydroxide, the nucleation step in which plate-shaped crystal nuclei are mainly formed by a nucleation reaction and the particle growth step in which particle growth is mainly performed on both surfaces of each of the plate-shaped crystal nuclei are clearly separated. Therefore, the process for producing a manganese-cobalt composite hydroxide makes it possible to control the particle shape of the resulting manganese-cobalt composite hydroxide. As will be described later, the nucleation step and the particle growth step can be separated by, for example, changing pH used in the nucleation step and pH used in the particle growth step from each other or changing a reaction vessel used in the nucleation step and a reaction vessel used in the particle growth step from each other.

(Nucleation Step)

In the nucleation step, an aqueous solution for nucleation obtained by dissolving a cobalt-containing metal compound in water in a predetermined ratio is adjusted to a pH of 12.5 or higher on the basis of a liquid temperature of 25° C. to form plate-shaped crystal nuclei.

Each of the crystal nuclei corresponds to the above-described cobalt concentration layer, that is, a layer containing cobalt at a high concentration, but may contain a metal element other than cobalt. In order to grow fine plate-shaped crystal nuclei, the content of cobalt to all metal elements contained in the crystal nuclei is set to 90 atom % or more, preferably 95 atom % or more. In order to sufficiently grow fine plate-shaped crystal nuclei, the crystal nuclei are preferably made of only a hydroxide of cobalt.

In the nucleation step, first, an aqueous solution for nucleation is prepared by dissolving a cobalt-containing metal compound and another metal compound in water so that the resulting crystal nuclei can have a desired composition.

Then, the pH of the prepared aqueous solution for nucleation is controlled to be 12.5 or higher on the basis of a liquid temperature of 25° C. by adding an inorganic alkaline aqueous solution to the aqueous solution for nucleation. The pH of the aqueous solution for nucleation can be measured with a common pH meter.

In the nucleation step, the aqueous solution for nucleation is allowed to have a desired composition and the pH of the aqueous solution for nucleation is adjusted to 12.5 or higher at a liquid temperature of 25° C. so that crystal nuclei are grown to have a plate shape, that is, formation of fine plate-shaped crystal nuclei is preferentially performed. As a result, in the nucleation step, fine plate-shaped crystal nuclei of a cobalt-containing composite hydroxide are formed in the aqueous solution for nucleation so that a slurry of plate-shaped crystal nuclei is obtained.

Figure 2:
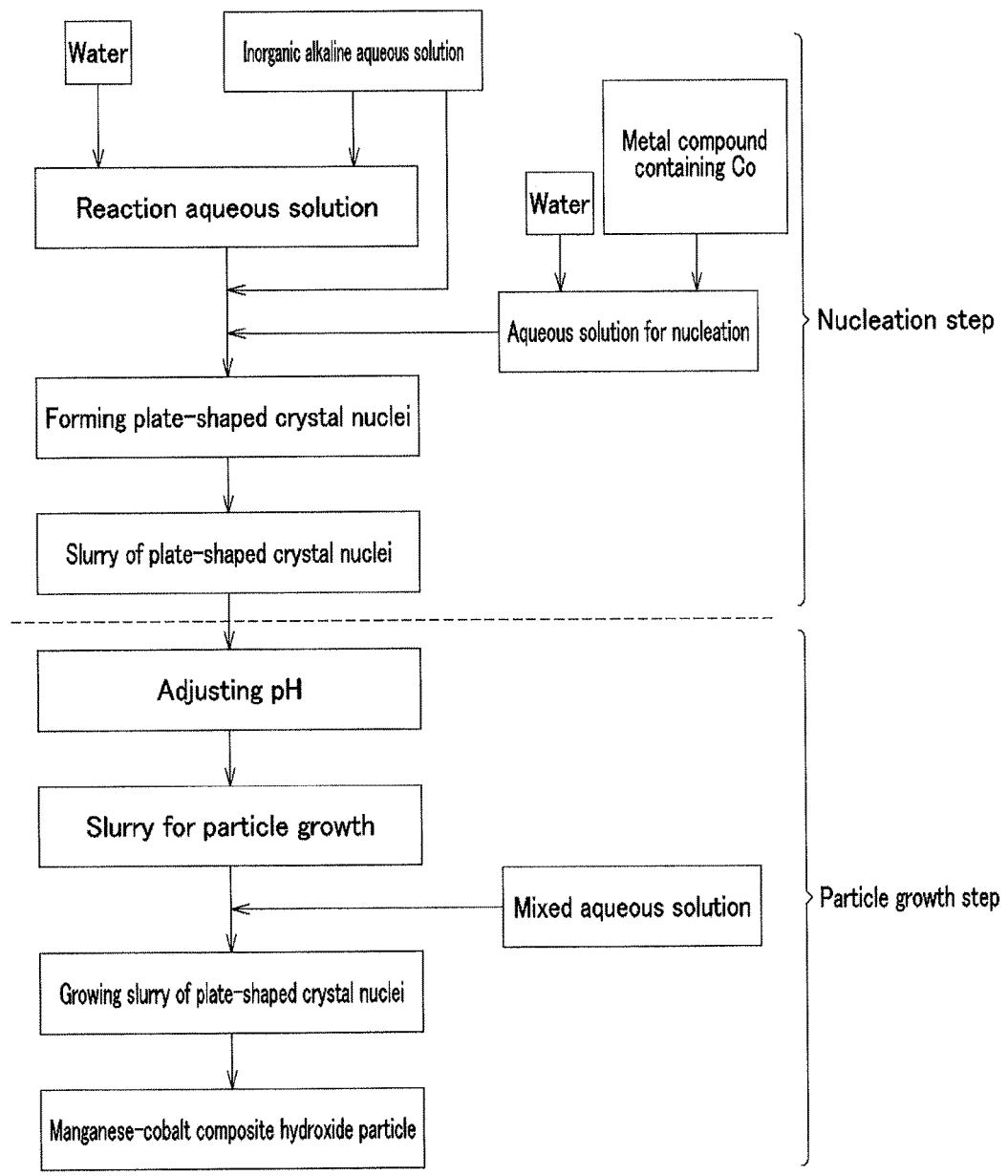
FIG. 2 is a flowchart that illustrates a process for producing a manganese-cobalt composite hydroxide according to the present invention different from the production process illustrated in FIG. 1 in a nucleation step.

The nucleation step is not limited to one shown in FIG. 1, and may be, for example, one shown in FIG. 2. In the nucleation step shown in FIG. 1, the inorganic alkaline aqueous solution is directly added to the aqueous solution for nucleation to form plate-shaped crystal nuclei.

On the other hand, in the nucleation step shown in FIG. 2, an reaction aqueous solution is previously prepared by adding water to the inorganic alkaline aqueous solution so that the pH of the reaction aqueous solution is adjusted to 12.5 or higher, and the aqueous solution for nucleation is supplied to a reaction vessel, in which the reaction aqueous solution is stirred, to form plate-shaped crystal nuclei while the inorganic alkaline aqueous solution is added to maintain the pH of the reaction aqueous solution so that a slurry of plate-shaped crystal nuclei is obtained. The process in which the aqueous solution for nucleation is supplied while the pH of the reaction aqueous solution is maintained is preferred because the pH can be strictly controlled and therefore plate-shaped crystal nuclei are easily formed.

The nucleation step shown in FIG. 1 or 2 is completed when a predetermined amount of crystal nuclei is formed from the aqueous solution for nucleation and the inorganic alkaline aqueous solution in the slurry of plate-shaped crystal nuclei. The determination as to whether a predetermined amount of crystal nuclei has been formed is made based on the amount of a metal salt added to the aqueous solution for nucleation.

The amount of the nuclei formed in the nucleation step is not particularly limited. However, in order to obtain manganese-cobalt composite hydroxide particles whose shape-specifying values described above are within their respective ranges, the amount of the nuclei formed in the nucleation step is preferably 0.1% or more but 2% or less, more preferably 0.1% or more but 1.5% or less of the total amount, that is, the total amount of metal salts supplied to obtain manganese-cobalt composite hydroxide particles.

(Particle Growth Step)

Then, the particle growth step is performed. In the particle growth step, after the completion of the nucleation step, the slurry of plate-shaped crystal nuclei in the reaction vessel is adjusted to a pH of 10.5 to 12.5, preferably 11.0 to 12.0 on the basis of a liquid temperature of 25° C. but lower than the pH in the nucleation step to obtain a slurry for particle growth in the particle growth step. More specifically, the pH is controlled by adjusting the amount of the inorganic alkaline aqueous solution supplied. It is to be noted that the particle growth step shown in FIG. 1 and the particle growth step shown in FIG. 2 are performed in the same manner.

In the particle growth step, a mixed aqueous solution containing at least a manganese-containing metal compound is supplied to the slurry for particle growth. In order to obtain a manganese-cobalt composite hydroxide having a desired composition ratio, if necessary, the mixed aqueous solution may contain, in addition to the manganese-containing metal compound, a nickel-containing metal compound, a cobalt-containing metal compound, or an additive element-containing metal compound. The proportion of metals in primary particles grown from the plate-shaped crystal nuclei as nuclei in the particle growth step is the same as the proportion of metals in the mixed aqueous solution. The proportion of metals in the plate-shaped crystal nuclei formed in the nucleation step is also the same as the proportion of metals in the aqueous solution for nucleation. Therefore, the total of the metal salt used in the nucleation step and the metal salt contained in the mixed aqueous solution used in the particle growth step is adjusted to achieve a desired proportion of metals in the resulting manganese-cobalt composite hydroxide.

In the particle growth step, the slurry for particle growth is adjusted to a pH of 10.5 to 12.5, preferably 11.0 to 12.0 on the basis of a liquid temperature of 25° C. but lower than the pH in the nucleation step so that the crystal nuclei growth reaction is more preferentially performed than the crystal nuclei-forming reaction. Therefore, in the particle growth step, new nuclei are hardly formed in the slurry for particle growth, but the plate-shaped crystal nuclei are grown to particles.

In order to form a manganese-cobalt composite hydroxide having a composition represented by the above general formula (1), the amount of cobalt contained in the mixed aqueous solution used in the particle growth step is smaller than that contained in the aqueous solution for nucleation, and therefore fine plate-shaped crystal nuclei are not formed. Therefore, the plate-shaped crystal nuclei are grown to particles so that plate-shaped primary particles having a cobalt-containing high concentration layer in the center thereof are formed, and further the primary particles are aggregated in an overlapped manner so that manganese-cobalt composite hydroxide particles are obtained.

Along with the particle growth caused by supplying the mixed aqueous solution, the pH of the slurry for particle growth varies, and therefore the inorganic alkaline aqueous solution is supplied also to the slurry for particle growth in addition to the mixed aqueous solution to control the pH of the slurry for particle growth so that the pH is maintained in the range of 10.5 to 12.5 on the basis of a liquid temperature of 25° C.

Then, the particle growth step is completed at the time when the manganese-cobalt composite hydroxide particles are grown to have a predetermined particle size and a predetermined aspect ratio. The relationship between the amount of a metal salt added in each of the nucleation step and the particle growth step and the resulting particles may be determined by a preliminary test. This makes it possible to easily determine the particle size and aspect ratio of the manganese-cobalt composite hydroxide particles from the amount of a metal salt added in each of the steps.

As described above, in the process for producing a manganese-cobalt composite hydroxide, plate-shaped crystal nuclei are preferentially formed in the nucleation step, and then, in the particle growth step, only the growth of the plate-shaped crystal nuclei into plate-shaped primary particles and the formation of secondary particles due to aggregation of the plate-shaped primary particles occur, that is, new crystal nuclei are hardly formed. Therefore, uniform plate-shaped crystal nuclei can be formed in the nucleation step, and the plate-shaped crystal nuclei can be uniformly grown to particles in the particle growth step. Further, since the plate-shaped crystal nuclei are uniformly grown to plate-shaped primary particles without causing nucleation, the plate-shaped primary particles are also uniformly aggregated. Therefore, according to the process for producing a manganese-cobalt composite hydroxide, it is possible to obtain uniform manganese-cobalt composite hydroxide particles controlled to have a narrow particle size distribution and a desired shape.

It is to be noted that in the process for producing a manganese-cobalt composite hydroxide, metal ions are crystallized out as plate-shaped crystal nuclei or composite hydroxide particles in each of the steps, and therefore the ratio of a liquid component to a metal component in each of the slurries increases. In this case, the concentration of a metal salt supplied is reduced in appearance, and therefore there is a possibility that composite hydroxide particles are not satisfactorily grown particularly in the particle growth step.

Therefore, in order to prevent the increase in the liquid component, part of the liquid component contained in the slurry for particle growth is preferably discharged to the outside of the reaction vessel between the time point after the completion of the nucleation step and the time point during the particle growth step. More specifically, for example, the plate-shaped crystal nuclei or the manganese-cobalt composite hydroxide particles are settled down by temporarily stopping the supply of the inorganic alkaline aqueous solution and the mixed aqueous solution to the slurry for particle growth and the stirring of the slurry for particle growth to discharge the supernatant of the slurry for particle growth. This makes it possible to increase the relative concentration of the mixed aqueous solution in the slurry for particle growth. In this case, the manganese-cobalt composite hydroxide particles can be grown under conditions where the relative concentration of the mixed aqueous solution is high, and therefore the particle size distribution of the manganese-cobalt composite hydroxide particles can be made narrower so that the density of secondary particles of the manganese-cobalt composite hydroxide particles can be increased as a whole.

Further, the particle growth steps shown in FIGS. 1 and 2 are advantageous in that the slurry for particle growth is obtained by adjusting the pH of the slurry of plate-shaped crystal nuclei obtained in the nucleation step to successively perform the particle growth step after the nucleation step, and therefore a quick transition to the particle growth step can be achieved. Further, the transition from the nucleation step to the particle growth step can be made simply by adjusting the pH of the slurry of plate-shaped crystal nuclei, which is advantageous in that the pH can be easily adjusted simply by temporarily stopping the supply of the inorganic alkaline aqueous solution or by adding an inorganic acid that is of the same kind as an acid constituting the metal compound (e.g., by adding sulfuric acid when the metal compound is a sulfate) to the slurry of plate-shaped crystal nuclei.

Figure 3:
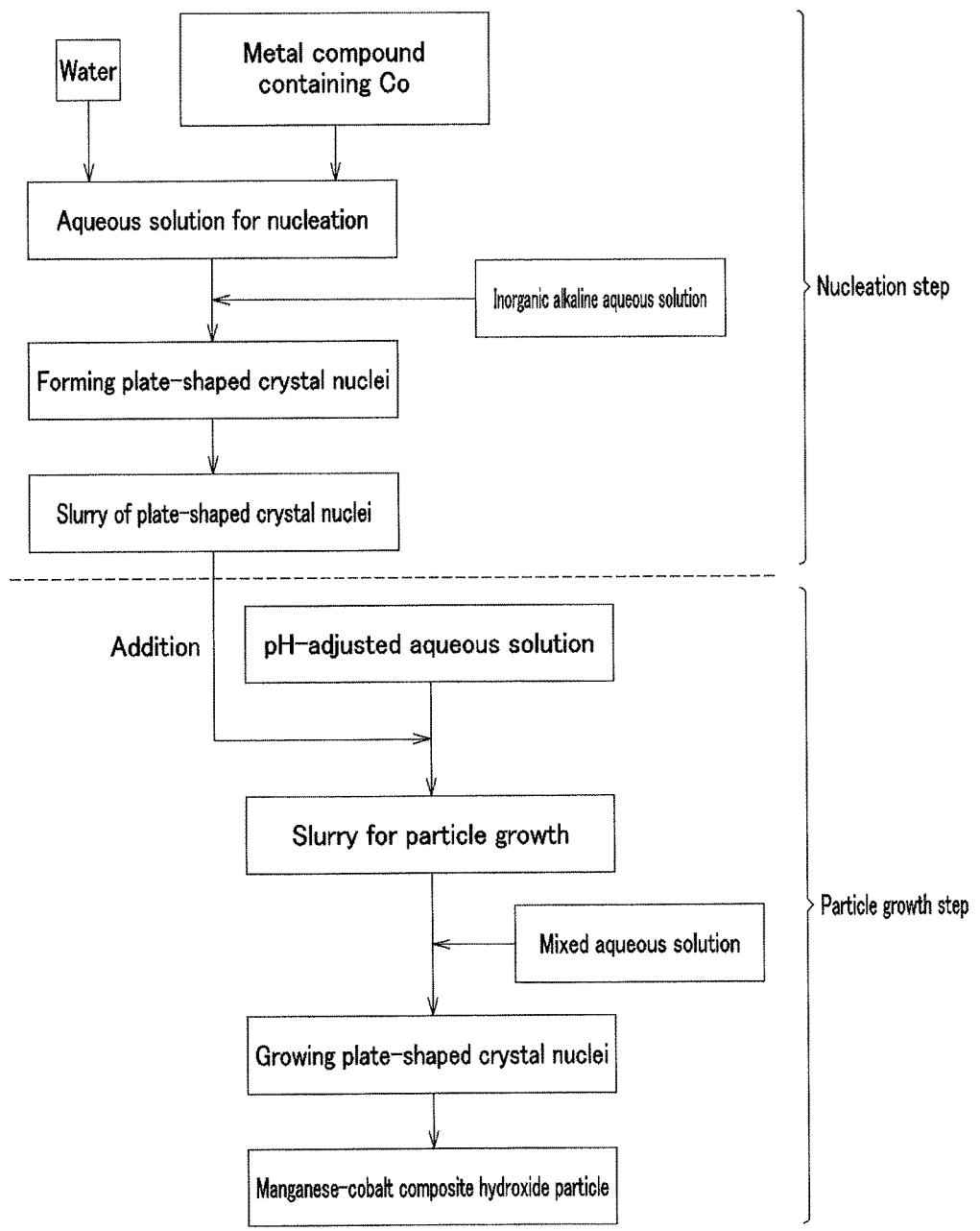
FIG. 3 is a flowchart that illustrates a process for producing a manganese-cobalt composite hydroxide according to the present invention different from the production process illustrated in FIG. 1 in a particle growth step.

Here, the particle growth step is not limited to one shown in FIGS. 1 and 2, and may be one shown in FIG. 3. In the nucleation step shown in FIG. 3, plate-shaped crystal nuclei may be obtained by directly adding the inorganic alkaline aqueous solution to the aqueous solution for nucleation as in the case of the nucleation step shown in FIG. 1 or by supplying the aqueous solution for nucleation to the reaction aqueous solution with stirring while adjusting the pH of the reaction aqueous solution as in the case of the nucleation step shown in FIG. 2.

In the particle growth step shown in FIG. 3, a pH-adjusted aqueous solution whose pH is adjusted by the inorganic alkaline aqueous solution to be suitable for the particle growth step is prepared separately from the slurry of plate-shaped crystal nuclei. Then, the slurry of plate-shaped crystal nuclei formed by performing the nucleation step in another reaction vessel, preferably the slurry of plate-shaped crystal nuclei from which part of the liquid component has been removed in the above-described manner is added to the pH-adjusted aqueous solution to prepare a slurry for particle growth. This slurry for particle growth is used to perform the particle growth step in the same manner as in the particle growth step shown in FIG. 1 or 2.

According to the process for producing a manganese-cobalt composite hydroxide shown in FIG. 3, the nucleation step and the particle growth step can more reliably be separated from each other, and therefore the conditions of the reaction aqueous solution in each of the steps can be optimized for each of the steps. Particularly, the pH of the slurry for particle growth can be optimized from the start point of the particle growth step. Therefore, the manganese-cobalt composite hydroxide obtained in the particle growth step can have a narrower particle size distribution can be made uniform and can have a narrower particle size distribution.

<1-2-2> Control of pH and Reaction Atmosphere, Particle Size, and Ammonia Concentration Hereinbelow, the control of pH and reaction atmosphere in each of the steps, the particle size of manganese-cobalt composite hydroxide, and an ammonia concentration will be described in detail.

(pH Control in Nucleation Step)

As described above, in the nucleation step shown in FIGS. 1 to 3, the pH of the aqueous solution for nucleation needs to be controlled to be 12.5 or higher on the basis of a liquid temperature of 25° C. If the pH on the basis of a liquid temperature of 25° C. is lower than 12.5, plate-shaped crystal nuclei are formed but the crystal nuclei themselves are large, and therefore plate-shaped secondary particles formed by aggregation of plate-shaped primary particles cannot be obtained in the subsequent particle growth step. On the other hand, although finer plate-shaped crystal nuclei can be obtained at a higher pH, if the pH exceeds 14.0, there is a case where crystallization is difficult to occur due to the gelation of a reaction liquid or plate-shaped primary particles of the manganese-cobalt composite hydroxide are too small. That is, in the nucleation step, the pH of the aqueous solution for nucleation is set to 12.5 or higher, preferably 12.5 to 14.0, more preferably 12.5 to 13.5 so that plate-shaped crystal nuclei can be satisfactorily formed.

(pH Control in Particle Growth Step)

In the particle growth step, the pH of the slurry for particle growth needs to be controlled to be 10.5 to 12.5, preferably 11.0 to 12.0 on the basis of a liquid temperature of 25° C. but lower than the pH in the nucleation step. If the pH on the basis of a liquid temperature of 25° C. is lower than 10.5, the amount of impurities contained in the resulting manganese-cobalt composite hydroxide, for example, anionic constituent elements contained in metal salts is increased. Further, if the pH exceeds 12.5, new crystal nuclei are formed in the particle growth step, which deteriorates the particle size distribution. That is, in the particle growth step, the pH of the slurry for particle growth is controlled to be 10.5 to 12.5 and lower than the pH in the nucleation step, which makes it possible to preferentially cause only the growth of plate-shaped crystal nuclei formed in the nucleation step into plate-shaped primary particles and the aggregation of the plate-shaped primary particles and to prevent the formation of new crystal nuclei so that the resulting manganese-cobalt composite hydroxide is uniform and has a narrow particle size distribution and a controlled shape. In order to more clearly separate nucleation and particle growth from each other, the pH of the slurry for particle growth is preferably controlled to be lower than the pH in the nucleation step by 0.5 or more, more preferably 1.0 or more.

In either of the nucleation step and the particle growth step, the fluctuation range of the pH is preferably plus/minus 0.2 from the set value. If the fluctuation range of the pH is large, there is a case where nucleation and particle growth are not uniformly performed, and therefore it is impossible to obtain uniform manganese-cobalt composite hydroxide particles having a narrow particle size distribution.

(Reaction Atmosphere of Nucleation Step)

In the nucleation step, nucleation is preferably performed in a non-oxidizing atmosphere whose oxygen concentration is 5 vol % or less. This makes it possible to prevent the oxidation of cobalt and therefore to promote the formation of a plate-shaped monocrystal hydroxide, thereby allowing fine plate-shaped crystal nuclei to be formed. When the oxygen concentration is increased, the thickness of the plate-shaped crystal nuclei tends to increase. If the oxygen concentration exceeds 5 vol %, there is a case where fine crystals are aggregated to form spherical or massive nuclei so that plate-shaped crystal nuclei cannot be obtained. When the plate-shaped crystal nuclei are thicker, the resulting composite hydroxide has a lower aspect ratio. The non-oxidizing atmosphere is defined by the oxygen concentration of an atmosphere that is in contact with the aqueous solution during the formation of crystal nuclei or the slurry of plate-shaped crystal nuclei. In order to grow plate-shaped crystal nuclei, the oxygen concentration is preferably 2 vol % or less, more preferably 1 vol % or less.

(Reaction Atmosphere of Particle Growth Step)

Also when the particle growth step is performed in an oxidizing atmosphere, there is a case where the plate-shaped crystal nuclei are not grown into dense primary particles so that the resulting manganese-cobalt composite hydroxide particles are poor in denseness. Therefore, an atmosphere during particle growth, that is, an atmosphere that is in contact with the slurry for particle growth is preferably one whose oxygen concentration is 10 vol % or less, more preferably one whose oxygen concentration is 2 vol % or less as in the case of the nucleation step.

Examples of means for maintaining the above-described atmosphere in the inner space of the reaction vessel in each of the steps include flowing of an inert gas such as nitrogen into the inner space of the reaction vessel and bubbling of an inert gas in the reaction liquid.

(Particle Size of Manganese-Cobalt Composite Hydroxide)

The aspect ratio of the formed manganese-cobalt composite hydroxide correlates to the size of the crystal nuclei, and therefore can be controlled by adjusting the pH, the reaction atmosphere, a stirring power, etc. in the nucleation step. When the plate-shaped crystal nuclei are grown under conditions where oxidation is prevented and a stirring power is low, primary particles having a large aspect ratio can be obtained, and therefore a manganese-cobalt composite hydroxide having a large aspect ratio can be obtained. Further, when the plate-shaped crystal nuclei are grown, large plate-shaped primary particles can be obtained.

Further, the volume-average particle size (Mv) can be controlled by the time period of the particle growth step. Therefore, manganese-cobalt composite hydroxide particles having a desired particle size can be obtained by continuing the particle growth step until a desired particle size can be achieved. That is, the above-described shape-specifying values can be controlled to fall within their respective ranges by controlling the aspect ratio in the nucleation step and regulating the aggregation of primary particles in the particle growth step.

(Ammonia Concentration)

In the particle growth step, ammonia is preferably added as a complexing agent to the slurry for particle growth. In this case, the concentration of ammonia in the slurry for particle growth is preferably controlled to be 5 g/L to 20 g/L. Since ammonia functions as a complexing agent, if the ammonia concentration is less than 5 g/L, the solubility of metal ions cannot be kept constant so that plate-shaped primary particles grown from the plate-shaped crystal nuclei are not uniform, which may cause variations in the particle size of the manganese-cobalt composite hydroxide. If the ammonia concentration exceeds 20 g/L, there is a case where the solubility of metal ions becomes excessively large, and therefore the amount of metal ions remaining in the slurry for particle growth is increased so that compositional deviation or the like occurs.

Further, if the ammonia concentration fluctuates, the solubility of metal ions also fluctuates so that a uniform manganese-cobalt composite hydroxide is not formed. For this reason, the ammonia concentration is preferably kept at a constant value. For example, the ammonia concentration is preferably kept at a desired concentration so that its fluctuation range is from a value lower by about 5 g/L than a set concentration to a value higher by about 5 g/L than the set concentration.

Ammonia is added using an ammonium ion supplier. The ammonium ion supplier is not particularly limited, and may be, for example, ammonia, ammonium sulfate, ammonium chloride, ammonium carbonate, or ammonium fluoride.

<1-2-3> Metal Compound to be Used, Reaction Conditions, Etc.

Hereinbelow, the metal compound (metal salt) to be used and conditions such as reaction temperature will be described. It is to be noted that differences in these conditions between the nucleation step and the particle growth step are only the above-described pH and range in which the composition of the aqueous solution for nucleation or the mixed aqueous solution is controlled, and the metal compound and conditions such as reaction temperature are substantially the same in both the steps.

(Metal Compound)

As the metal compound, a compound containing a desired metal is used. The compound to be used is preferably a water-soluble compound, and examples of such a water-soluble compound include metal salts such as a nitrate, a sulfate, and a hydrochloride. For example, nickel sulfate, manganese sulfate, and cobalt sulfate are preferably used.

(Additive Element)

The additive element in the general formula (1) (at least one additive element selected from V, Mg, Al, Ti, Mo, Nb, Zr, and W) is preferably added using a water-soluble compound, and examples of such a water-soluble compound include vanadium sulfate, ammonium vanadate, magnesium sulfate, aluminum sulfate, titanium sulfate, ammonium peroxotitanate, titanium potassium oxalate, zirconium sulfate, zirconium nitrate, niobium oxalate, ammonium molybdate, sodium tungstate, and ammonium tungstate.

The additive element may be added by adding an additive containing the additive element to the aqueous solution for nucleation or the mixed aqueous solution so that coprecipitation can be performed in a state where the additive element is uniformly dispersed inside the manganese-cobalt composite hydroxide particles.

The additive element may also be added by coating the surface of the resulting manganese-cobalt composite hydroxide with a compound containing the additive element. It is to be noted that when the surface is coated with the additive element, the atomic ratio of metal ions of the manganese-cobalt composite hydroxide can be made coincident with the final composition ratio by reducing the atomic ratio of additive element ions present during the formation of the composite hydroxide by crystallization by the amount required for coating. Further, the coating of the surface of the manganese-cobalt composite hydroxide with the additive element may be performed on particles obtained by heating the composite hydroxide.

(Concentration of Mixed Aqueous Solution in Particle Growth Step)

The concentration of the mixed aqueous solution is 1.0 mol/L to 2.6 mol/L, preferably 1.5 mol/L to 2.2 mol/L in terms of the total of metal compounds. If the concentration of the mixed aqueous solution is less than 1.0 mol/L, there is a disadvantage that productivity is reduced due to a reduction in the amount of a crystallized product per reaction vessel.

On the other hand, if the concentration of the mixed aqueous solution exceeds 2.6 mol/L, it exceeds the saturation concentration at ordinary temperature and therefore, for example, there is a risk that pipes of equipment are clogged with re-precipitated crystals.

Further, it is not always necessary to supply, as the mixed aqueous solution, a mixed aqueous solution containing all the metal compounds required for the reaction to the reaction vessel. For example, when metal compounds that form a compound by a reaction caused by mixing are used, their aqueous solutions may be separately prepared so that the total concentration of all the metal compound aqueous solutions is 1.0 mol/L to 2.6 mol/L, and then simultaneously supplied as individual metal compound aqueous solutions in a predetermined ratio into the reaction vessel. The aqueous solution for nucleation used in the nucleation step may also be prepared as in the case of the mixed aqueous solution.

(Reaction Liquid Temperatures in Nucleation Step and Particle Growth Step)

The liquid temperature of the reaction liquid during the reaction in each of the steps is preferably set to 20° C. or higher, particularly preferably 20° C. to 70° C. When the liquid temperature is less than 20° C., nucleation is likely to occur due to low solubility, which increases difficulty in control. Further, in the particle growth step, there is a case where microparticles are formed due to the formation of new nuclei. On the other hand, when ammonia is added, volatilization of ammonia is promoted if the liquid temperature exceeds 70° C. In this case, it is necessary to excessively add the ammonium ion supplier to keep the concentration of ammonia at a predetermined level, which leads to higher costs. When ammonia is not added, the liquid temperature is preferably set to 40° C. to 70° C. to achieve satisfactory solubility of metal ions.

(Inorganic Alkaline Aqueous Solution in Nucleation Step and Particle Growth Step)

The inorganic alkaline aqueous solution used to adjust pH is not particularly limited, and examples thereof include aqueous alkali metal hydroxide solutions such as sodium hydroxide and potassium hydroxide. In the case of such an alkali metal hydroxide, the alkali metal hydroxide may be directly supplied, but is preferably added in the form of an aqueous solution due to the ease of pH control during crystallization.

Further, a process for adding the inorganic alkaline aqueous solution is not particularly limited, either. For example, the inorganic alkaline aqueous solution may be added using a pump capable of controlling a flow rate, such as a metering pump, while the reaction aqueous solution or the slurry of plate-shaped crystal nuclei is well stirred so that the pH is kept within a predetermined range.

(Production Equipment)

In the process for producing a manganese-cobalt composite hydroxide, an apparatus is used which is of a type in which a product is not collected until a reaction is completed. For example, a conventionally-used batch-type reaction vessel equipped with a stirrer is used. When such an apparatus of a type in which a product is not collected until a reaction is completed is used, unlike a commonly-used continuous crystallizer in which a product is collected by overflow, particles having a uniform particle size and a narrow particle size distribution can be obtained because there is not a problem that growing particles are collected together with an overflow liquid.

Further, when the reaction atmosphere is controlled, an apparatus capable of controlling an atmosphere, such as a closed apparatus, is preferably used. When such an apparatus is used, it is possible to easily obtain the above-described manganese-cobalt composite hydroxide including plate-shaped secondary particles each obtained by aggregation of plate-shaped primary particles.

As described above, the process for producing a manganese-cobalt composite hydroxide includes: a nucleation step in which an aqueous solution for nucleation that contains a cobalt-containing metal compound so that a content of cobalt to all metal elements is 90 atom % or more is adjusted to a pH of 12.5 or more on the basis of a liquid temperature of 25° C. to form plate-shaped crystal nuclei; and a particle growth step in which a slurry for particle growth containing the plate-shaped crystal nuclei formed in the nucleation step is adjusted to a pH of 10.5 to 12.5 on the basis of a liquid temperature of 25° C. but less than the pH in the nucleation step, and a mixed aqueous solution containing at least a manganese-containing metal compound is supplied to the slurry for particle growth to grow the plate-shaped crystal nuclei, and therefore the above-described distinctive manganese-cobalt composite hydroxide can be obtained.

In the process for producing a manganese-cobalt composite hydroxide, the nucleation step and the particle growth step are clearly separately performed, and therefore the above-described distinctive manganese-cobalt composite hydroxide can be obtained. Further, the production process is easily performed, achieves high productivity, and is suitable for industrial-scale production, and therefore its industrial value is significantly high.

[2] Positive Electrode Active Material for Non-Aqueous Electrolyte Secondary Batteries and Process for Producing the Same (2-1) Positive Electrode Active Material for Non-Aqueous Electrolyte Secondary Batteries A positive electrode active material for non-aqueous electrolyte secondary batteries according to an embodiment of the present invention includes a lithium-manganese-cobalt composite oxide represented by a general formula (2): $Li_{1+u}Ni_xCo_yMn_zM_tO_{2+\alpha}$ (wherein u satisfies $-0.05 \leq u < 0.60$, x satisfies $0 \leq x \leq 0.5$, y satisfies $0 < y \leq 0.5$, z satisfies $0.35 < z < 0.8$, t satisfies $0 \leq t \leq 0.1$, $\alpha$ satisfies $0 \leq \alpha < 0.6$, x, y, z, and t satisfy $x+y+z+t=1$, and M is at least one additive element selected from V, Mg, Al, Ti, Mo, Nb, Zr, and W) and having a hexagonal layered structure. This positive electrode active material includes plate-shaped secondary particles each obtained by aggregation of a plurality of plate-shaped primary particles of the lithium-manganese-cobalt composite oxide caused by overlapping of plate surfaces of the plate-shaped primary particles, wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method.

The above composition makes it possible for the positive electrode active material for non-aqueous electrolyte secondary batteries to offer excellent performance. Further, since the positive electrode active material includes plate-shaped secondary particles each obtained by aggregation of a plurality of plate-shaped primary particles of the lithium-manganese-cobalt composite oxide caused by overlapping of plate surfaces of the plate-shaped primary particles, the positive electrode active material can have an increased area of contact with an electrolytic solution and can achieve a high filling density due to its plate shape. Therefore, when this positive electrode active material is used in a positive electrode of a battery, a high output characteristic, a high battery capacity, and a high electrode density can be achieved.

(Composition)

In the positive electrode active material, u representing an excess amount of lithium satisfies $-0.05 \leq u < 0.60$. If the excess amount of lithium u is less than $-0.05$, that is, if the lithium content is less than 0.95, the reaction resistance of a positive electrode using the resulting positive electrode active material in a non-aqueous electrolyte secondary battery is increased so that the output of the battery is reduced.

On the other hand, if the excess amount of lithium u exceeds 0.60, that is, if the lithium content exceeds 1.60, the initial discharge capacity of a battery having a positive electrode using the resulting positive electrode active material is reduced and the reaction resistance of the positive electrode is also increased.

Further, x representing the nickel content satisfies $0 \leq x \leq 0.50$. Nickel is an element that contributes to an improvement in initial discharge capacity. If the value of x exceeds 0.50, thermal stability is significantly reduced.

Further, y representing the cobalt content satisfies $0 < y \leq 0.5$. Cobalt is an element that contributes to an improvement in cycle characteristic. If the value of y exceeds 0.50, a reduction in initial discharge capacity is significantly reduced. As described above, since the manganese-cobalt composite hydroxide as a precursor used to produce the positive electrode active material grows from plate-shaped crystal nuclei made of a hydroxide containing at least cobalt, y satisfies $0 < y$, preferably satisfies $0.05 \leq y \leq 0.50$, more preferably $0.1 \leq y \leq 0.50$.

Further, z representing the manganese content satisfies $0.35 < z < 0.8$. Manganese is an element that contributes to an improvement in thermal stability and forms $Li_2M'O_3$, which will be described later, to improve an initial discharge capacity. If the value of z is 0.8 or more, manganese is eluted into an electrolytic solution during storage at high temperature or operation of a battery, characteristic deterioration occurs.

As shown by the general formula (2), the positive electrode active material is more preferably prepared by allowing a lithium-transition metal composite oxide to contain an additive element M. When the positive electrode active material contains the additive element M, the durability or output characteristic of a battery using such a positive electrode active material can be improved. Particularly, when the additive element M is uniformly distributed in the surface or inside of the particles, the entire particles can obtain these effects. Therefore, addition of only a small amount of the additive element M makes it possible to obtain these effects and prevent a reduction in capacity.

If the ratio t of atoms of the additive element M to all the atoms exceeds 0.1, the amount of metal elements that contribute to a Redox reaction is reduced, which is disadvantageous in that a battery capacity is reduced. Therefore, the atomic ratio of the additive element M is adjusted to satisfy $0 \leq t \leq 0.1$.

(Shape and Structure of Particles)

The positive electrode active material uses, as its precursor, the above-described manganese-cobalt composite hydroxide including plate-shaped secondary particles each obtained by aggregation of a plurality of plate-shaped manganese-cobalt composite hydroxide primary particles, whose shape as projected in a direction perpendicular to the plate surfaces thereof is any one of a spherical shape, an elliptical shape, an oval shape, and a planar projected shape of a potato-like block-shaped object, caused by overlapping of plate surfaces of the plate-shaped primary particles. Therefore, the positive electrode active material has the same particle structure as the manganese-cobalt composite hydroxide.

In the positive electrode active material having such a structure, voids are sufficiently present also in the surfaces of the primary particles in each of the secondary particles as in the case of the manganese-cobalt composite hydroxide. Therefore, such a positive electrode active material has a larger specific surface area as compared to common plate-shaped particles including plate-shaped secondary particles formed as polycrystals including primary particles. Further, the individual primary particles have a small particle size, which makes it possible to easily perform lithium insertion/extraction and therefore to increase the insertion/extraction speed of lithium. Further, the secondary particles are formed from constituent particles each obtained by aggregation of the primary particles, which makes it possible to sufficiently spread an electrolyte in the secondary particles. Further, lithium insertion/extraction is performed in gaps or grain boundaries between the primary particles, which makes it possible to further increase the insertion/extraction speed of lithium. These effects make it possible to achieve an output characteristic similar to that when small-diameter particles are used, that is, an output characteristic significantly improved as compared to that when plate-shaped particles are used.

On the other hand, since the individual secondary particles are two-dimensionally grown by aggregation caused by overlapping of the plate surfaces of the primary particles, gaps between particles such as those created by filling with small-diameter particles can be reduced by orienting the secondary particles when an electrode is produced by filling with the secondary particles. This makes it possible to achieve a high filling density and a high volume energy density. Further, it is also possible to reduce the thickness of an electrode film. Therefore, as described above, the use of the positive electrode active material including plate-shaped secondary particles each obtained by aggregation of a plurality of plate-shaped manganese-cobalt composite hydroxide primary particles caused by overlapping of plate surfaces of the plate-shaped primary particles makes it possible to simultaneously achieve a high output characteristic, a high battery capacity, and a high electrode density.

The secondary particles constituting the positive electrode active material have an aspect ratio of 3 to 20, preferably 4.5 to 20, more preferably 5 to 15, even more preferably 5 to 12, and the volume-average particle size (Mv) of the positive electrode active material as measured by a laser diffraction scattering method is 4 μm to 20 μm.

If the aspect ratio is less than 3, flatness of the plate shape is decreased, and therefore a high filling density cannot be achieved by orienting the secondary particles when an electrode is formed. Further, resistance is increased when lithium is diffused to the inside of the particles so that an output characteristic is reduced. On the other hand, if the aspect ratio exceeds 20, the particle strength of the secondary particles is reduced, and therefore the particles are easily collapsed when a slurry for forming an electrode is kneaded so that the effects obtained by the plate shape are not sufficiently exerted. Further, the filling density of the secondary particles in an electrode is also reduced so that a volume energy density is reduced.

If the volume-average particle size (Mv) is less than 4 μm, gaps between the secondary particles are increased during filling even when the secondary particles have a plate shape so that a volume energy density is reduced. Further, the viscosity of a slurry for forming an electrode is increased during kneading so that handleability is deteriorated. If the volume-average particle size (Mv) exceeds 20 μm, lineation occurs when an electrode film is formed, or a short circuit is caused by penetration into a separator. By setting the volume-average particle size (Mv) to 4 μm to 20 μm, it is possible to obtain a positive electrode active material that can achieve a high volume energy density when used in an electrode and can prevent lineation when an electrode film is formed or a short circuit caused by penetration into a separator.

Further, in the positive electrode active material, the average of maximum diameters of the plate-shaped primary particles projected in a direction perpendicular to the plate surfaces thereof (maximum diameters of the plate-shaped primary particles projected in a direction perpendicular to the plate surfaces of the secondary particles) is preferably 1 μm to 5 μm. In this case, insertion/extraction of lithium is performed in gaps or grain boundaries present between the plate-shaped primary particles, which makes it possible to achieve an output characteristic similar to that when small-diameter particles are used, that is, an output characteristic significantly improved as compared to that when plate-shaped particles are used. If the average of maximum diameters of the plate-shaped primary particles is less than 1 μm, there is a case where gaps between the plate-shaped primary particles become too large, and therefore the denseness of the secondary particles is reduced so that a satisfactory filling density cannot be achieved. On the other hand, if the average of maximum diameters exceeds 5 μm, there is a case where the effects obtained by filling with small-diameter particles cannot be sufficiently obtained. The shape-specifying values (aspect ratio, Mv) and the average of maximum diameters of the plate-shaped primary particles can be determined in the same manner as those of the manganese-cobalt composite hydroxide as a precursor.

(Particle Size Distribution)

The positive electrode active material preferably has a particle size variation index represented by [(D90−D10)/Mv] of 0.75 or less, which is calculated from D90 and D10 of a particle size distribution determined by a laser diffraction scattering method and the volume-average particle size (Mv).

When the positive electrode active material has a wide particle size distribution, many fine particles having a particle size much smaller than the average particle size and many coarse particles having a particle size much larger than the average particle size are present in the positive electrode active material. If a positive electrode is formed using a positive electrode active material containing many fine particles, there is a possibility that heat is generated due to a local reaction of the fine particles, and therefore there is a case where safety is reduced and a cycle characteristic is deteriorated because the fine particles are likely to be selectively deteriorated. On the other hand, if a positive electrode is formed using a positive electrode active material containing many coarse particles, the coarse particles reduce a reactive area between an electrolytic solution and the positive electrode active material so that there is a case where the output of a battery is reduced due to an increase in reaction resistance. By reducing the variation index, the characteristics of the positive electrode active material can be improved. However, the lower limit of the variation index is practically about 0.30.

Therefore, the ratio of fine particles or coarse particles can be reduced by setting the particle size variation index indicating the particle size distribution of the positive electrode active material, which is represented by [(D90−D10)/Mv], to 0.75 or less. A battery having a positive electrode using such a positive electrode active material has a higher level of safety, a higher cycle characteristic, and a higher output. It is to be noted that the average particle size, D90, and D10 are the same as those of the above-described composite hydroxide particles and can be measured in the same manner.

The lithium-manganese-cobalt composite oxide constituting the positive electrode active material is preferably one represented by $Li_{1+u}Ni_xCo_yMn_zM_tO_{2+\alpha}$ (wherein u satisfies $0.40 \leq u < 0.60$, satisfies $z-x \leq u$ when $z-x > 0.4$, and satisfies $u \leq z$ when $z < 0.6$, x satisfies $0 \leq x \leq 0.5$, y satisfies $0 < y \leq 0.5$, z satisfies $0.5 \leq z < 0.8$, $\alpha$ satisfies $0.4 \leq \alpha < 0.6$, z and x satisfy $z-x < 0.6$, x, y, z, and t satisfy $x+y+z+t=1$, and M is at least one additive element selected from V, Mg, Al, Ti, Mo, Nb, Zr, and W).

When the positive electrode active material has such a composition, a hexagonal compound represented by a general formula: $LiMeO_2$, where Me represents a metal element other than Li, and a monoclinic compound represented by a general formula: $Li_2Me'O_3$, wherein Me' represents a metal element other than Li, are formed, which makes it possible to achieve a higher capacity. The reason for this is considered to be that when the positive electrode active material has such a composition, a monoclinic compound represented by $Li_2Me'O_3$, especially $Li_2MnO_3$, that contributes to a high capacity is formed, and a layered compound represented by $LiMeO_2$ that causes charge and discharge reactions due to the insertion and extraction of Li is present around $Li_2Me'O_3$, and therefore Li insertion and extraction reactions are promoted even in $Li_2Me'O_3$, in which Li insertion and extraction reactions are usually less likely to occur, so that a battery capacity is increased. Therefore, it is considered that when the ratio of $Li_2Me'O_3$ is higher, a discharge capacity is higher in terms of theoretical capacity. However, if the ratio of $Li_2Me'O_3$ is too high, the amount of $LiMeO_2$ present around $Li_2Me'O_3$ is reduced so that the effect of promoting the insertion and extraction of Li is reduced. Therefore, inactive $Li_2Me'O_3$ is increased so that a battery capacity is reduced. Further, it is advantageous for enhancement of such a promoting effect to increase the contact interfaces between $Li_2Me'O_3$ and $LiMeO_2$. Therefore, the positive electrode active material preferably has a structure in which $Li_2Me'O_3$ and $LiMeO_2$ are finely mixed.

Here, when u representing an excess amount of Li is increased, the amount of $Li_2Me'O_3$ present in the positive electrode active material is increased so that the capacity of a battery is increased. For this reason, u is preferably 0.40 or more. On the other hand, if u exceeds 0.60, there is a case where electricity cannot be extracted due to an extreme reduction in activity so that the initial discharge capacity of the positive electrode active material is reduced and the reaction resistance of the resulting positive electrode is increased.

Further, when an excess amount of Mn with respect to Ni, that is, "z−x" is more than 0.4, u needs to be equal to or more than (z−x). If u is less than (z−x), there is a case where the amount of $Li_2MnO_3$ formed is reduced so that a battery capacity is reduced. Further, if the excess amount of Li exceeds the amount of Mn when z representing the amount of Mn is less than 0.6, there is a case where a battery capacity is reduced due to an increase in the amount of excess Li that does not form $Li_2MnO_3$ with Mn.

At least one of Ni and Co is preferably contained, and x representing the amount of Ni satisfies $0 \leq x \leq 0.5$, and y representing the amount of Co satisfies $0 < y \leq 0.5$. If any one of x and y exceeds 0.5, the amount of $Li_2MnO_3$ formed is reduced so that a battery capacity is reduced. On the other hand, if both x and y are 0, $LiMeO_2$ is not formed so that a battery capacity is reduced.

Further, z representing the amount of Mn preferably satisfies $0.5 \leq z < 0.8$. If z is less than 0.5, there is a case where $Li_2MnO_3$ is not sufficiently formed and unreacted Li is present so that battery characteristics are deteriorated. On the other hand, if z is 0.8 or more, a spinel phase such as $LiNi_{0.5}Mn_{1.5}O_4$ is formed due to a shortage of Li necessary for forming $Li_2MnO_3$ and $LiMnO_2$ so that battery characteristics are deteriorated. In order to prevent the formation of a spinel phase, "x−z" is preferably set to 0.6 or less.

Further, $\alpha$ in the general formula is a value representing an excess amount of oxygen (0), and is preferably in the same range as u to form $Li_2Me'O_3$ and $LiMeO_2$.

As described above, in order to achieve a higher capacity, the positive electrode active material preferably includes hexagonal $LiMeO_2$ and monoclinic $Li_2Me'O_3$.

Further, in the positive electrode active material, a site occupancy of metal ions other than lithium in a 3a site determined by Rietveld analysis of a peak corresponding to a hexagonal lithium-transition metal composite oxide in X-ray diffraction analysis is preferably 3% or less. When the site occupancy in the 3a site is within the above range, cation mixing does not occur in the lithium-manganese composite oxide, and therefore the lithium-manganese composite oxide has a high crystallinity, which makes it possible to achieve higher battery characteristics, especially a higher charge-discharge capacity or a higher output characteristic. If crystallinity is low, there is a case where metal ions in the 3a site interferes with the migration of lithium ions so that battery characteristic are deteriorated.

Further, the orientation index of a (003) plane corresponding to the hexagonal lithium-transition metal composite oxide constituting the positive electrode active material determined by X-ray diffraction analysis is preferably 0.9 to 1.1. The orientation index within the above range indicates that crystals are randomly arranged in a non-orientation state. When crystals are arranged in a non-orientation state, it is possible to simultaneously achieve a battery capacity or output characteristic influenced by the insertion and extraction performance of lithium and a cycle characteristic or safety influenced by the durability of the layered structure. If the (003) plane orientation index is shifted to any one of the sides, there is a case where characteristics required of a battery cannot be simultaneously achieved at a high level so that any one of battery characteristics is unsatisfactory.

As described above, the positive electrode active material includes a lithium-manganese-cobalt composite oxide including plate-shaped secondary particles each obtained by aggregation of a plurality of plate-shaped primary particles caused by overlapping of plate surfaces of the plate-shaped primary particles, wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method.

That is, the positive electrode active material is formed from the above-described distinctive manganese-cobalt composite hydroxide and a lithium compound, and therefore has a structure and characteristics derived from those of the manganese-cobalt composite hydroxide. Therefore, such a positive electrode active material has an increased area of contact with an electrolytic solution and achieves a high filling density in a positive electrode. As a result, the above-described positive electrode active material can form a thin electrode film, which makes it possible to provide a non-aqueous electrolyte secondary battery that can achieve a high output characteristic, a high battery capacity, and a high electrode density.

(2-2) Process for Producing Positive Electrode Active Material for Non-Aqueous Electrolyte Secondary Batteries A process for producing the above-described positive electrode active material includes at least a mixing step in which the above-described manganese-cobalt composite hydroxide and a lithium compound are mixed to form a mixture and a calcining step in which the mixture formed in the mixing step is calcined.

The process for producing the positive electrode active material is not particularly limited as long as the positive electrode active material can be produced so that the secondary particles have the above-described shape, structure and composition. However, the following process is preferred in that the positive electrode active material can more reliably be produced. Hereinbelow, each of the steps of the process will be described.

(a) Heat Treatment Step

First, the manganese-cobalt composite hydroxide produced in the above manner is heat-treated, if necessary.

The heat treatment step is a step in which the manganese-cobalt composite hydroxide is heat-treated by heating at a temperature of 300° C. to 750° C. in an oxidizing atmosphere to remove moisture contained in the manganese-cobalt composite hydroxide. By performing this heat treatment step, the amount of moisture remaining in the particles until a calcining step can be reduced to a certain level. This makes it possible to prevent variations in the ratio of the number of metal atoms and the number of lithium atoms in the resulting positive electrode active material. Therefore, it is possible to omit this step as long as the ratio of the number of metal atoms and the number of lithium atoms in the resulting positive electrode active material can accurately be controlled.

In the heat treatment step, it is only necessary to remove moisture so as not to cause variations in the ratio of the number of metal atoms and the number of lithium atoms in the resulting positive electrode active material, and therefore it is not always necessary to convert all the manganese-cobalt composite hydroxide to a manganese-cobalt composite oxide. However, in order to further reduce variations in the ratio of the number of atoms, all the manganese-cobalt composite hydroxide is preferably converted to a manganese-cobalt composite oxide at a heating temperature of 500° C. or higher.

If the heating temperature is less than 300° C. in the heat treatment step, there is a case where excess moisture contained in the manganese-cobalt composite hydroxide cannot sufficiently be removed so that it is impossible to satisfactorily prevent variations in the ratio of the number of atoms. On the other hand, if the heating temperature exceeds 750° C., there is a case where it is impossible to obtain a manganese-cobalt composite oxide having a uniform particle size due to sintering of the particles caused by heat treatment. Variations in the ratio of the number of atoms can be prevented by previously determining metal components contained in the manganese-cobalt composite hydroxide under heat treatment conditions by analysis to determine the ratio between the manganese-cobalt composite hydroxide and a lithium compound.

An atmosphere in which the heat treatment is performed is not particularly limited as long as the atmosphere is one in which reduction does not occur, that is, a non-reducing atmosphere. However, the heat treatment is preferably performed in an oxidizing atmosphere, especially in an air flow in which the heat treatment can be easily performed.

Further, the time of the heat treatment is not particularly limited, but is preferably at least 1 hour or more, more preferably 5 hours to 15 hours because if the time of the heat treatment is less than 1 hour, there is a case where excess moisture cannot be sufficiently removed from the manganese-cobalt composite hydroxide.

Further, equipment for use in the heat treatment is not particularly limited as long as the manganese-cobalt composite hydroxide can be heated in a non-reducing atmosphere, preferably in an air flow, but is preferably an electric furnace or the like that does not generate gas.

(b) Mixing Step

The mixing step is a step in which the manganese-cobalt composite hydroxide or the manganese-cobalt composite hydroxide that has been subjected to heat treatment in the heat treatment step (hereinafter, referred to as "heat-treated particles") and a lithium compound are mixed to obtain a lithium mixture.

Here, the heat-treated particles include not only the manganese-cobalt composite hydroxide whose residual moisture has been removed in the heat treatment step but also the manganese-cobalt composite oxide that has been converted from the manganese-cobalt composite hydroxide in the heat treatment step or mixed particles thereof.

The manganese-cobalt composite hydroxide or the heat-treated particles and a lithium compound are mixed so that the ratio (Li/ME) between the number of atoms of metals other than lithium contained in the lithium mixture, that is, the sum of the number of atoms of nickel, manganese, cobalt, and an additive element (ME) and the number of lithium atoms (Li) is 0.95 to 1.60, preferably 1 to 1.60, more preferably 1 to 1.50. More specifically, since the ratio Li/ME does not change before and after the calcining step, the ratio Li/Me achieved by mixing in the mixing step corresponds to the ratio Li/ME of the resulting positive electrode active material. Therefore, mixing is performed so that the ratio Li/ME of the lithium mixture becomes the same as that of the resulting positive electrode active material.

The lithium compound for use in forming a lithium mixture is not particularly limited, but is preferably, for example, lithium hydroxide, lithium nitrate, lithium carbonate, or a mixture of two or more of them for reasons of availability. Particularly, in consideration of easy handling and quality stability, lithium hydroxide or lithium carbonate is more preferably used.

It is to be noted that the lithium mixture is preferably well mixed before calcining. If the lithium mixture is not well mixed, there is a possibility that satisfactory battery characteristics cannot be achieved due to variations in the ratio Li/ME among the individual particles.

Further, the mixing can be performed using a common mixer such as a shaker mixer, a Loedige mixer, a Julia mixer, or a V blender. The mixing may be performed to such a degree that the manganese-cobalt composite hydroxide or the heat-treated particles does/do not lose its/their shape so that the manganese-cobalt composite hydroxide or the heat-treated particles and the lithium compound are well mixed.

(c) Calcining Step

The calcining step is a step in which the lithium mixture obtained in the mixing step is calcined to form a lithium-manganese-cobalt composite oxide. When the lithium mixture is calcined in the calcining step, lithium contained in the lithium compound is diffused into the manganese-cobalt composite hydroxide or the heat-treated particles so that lithium-manganese-cobalt composite oxide particles are formed. Further, even when a high concentration layer of cobalt is present in the manganese-cobalt composite hydroxide, the high concentration layer disappears due to diffusion so that no structural layered object is present.

(Calcining Temperature)

The lithium mixture is calcined at 650° C. to 1000° C., more preferably 750° C. to 980° C. If the calcining temperature is less than 650° C., diffusion of lithium into the manganese-cobalt composite hydroxide or the heat-treated particles is not satisfactorily performed so that excess lithium and the unreacted particles remain or a well-ordered crystal structure cannot be obtained. Therefore, when the resulting positive electrode active material is used in a battery, the battery cannot achieve satisfactory battery characteristics. Further, if the calcining temperature exceeds 1000° C., there is a possibility that heavy sintering between particles of the lithium-manganese-cobalt composite oxide occurs and abnormal grain growth occurs so that the particles after calcining become coarse and therefore the shape of the above-described secondary particles cannot be maintained. The thus obtained positive electrode active material cannot produce the above-described effect obtained by the shape of the secondary particles.

It is to be noted that from the viewpoint of uniformly performing a reaction between the manganese-cobalt composite hydroxide or the heat-treated particles and the lithium compound, temperature rise to the calcining temperature is preferably performed at a temperature rise rate of 3° C./min to 10° C./min. Further, the reaction can be more uniformly performed by maintaining the lithium mixture at a temperature close to the melting point of the lithium compound for about 1 hour to 5 hours.

(Calcining Time)

A holding time at the calcining temperature during calcining is preferably at least 2 hours, more preferably 4 hours to 24 hours. If the holding time is less than 2 hours, there is a case where the crystallinity of the resulting lithium-manganese-cobalt composite oxide is unsatisfactory. Although not particularly limited, when the lithium mixture is calcined in a sagger, the atmosphere is preferably cooled to 200° C. or less at a temperature decrease rate of 2° C./min to 10° C./min after the holding time to prevent the deterioration of the sagger.

(Temporary Calcining)

Particularly, when lithium hydroxide or lithium carbonate is used as the lithium compound, the lithium mixture is preferably temporarily calcined before calcining by maintaining it at a temperature that is lower than the calcining temperature but is 350° C. to 800° C., preferably 450° C. to 780° C. for about 1 hour to 10 hours, preferably 3 hours to 6 hours. That is, the lithium mixture is preferably temporarily calcined at a temperature at which a reaction occurs between lithium oxide or lithium carbonate and the manganese-cobalt composite hydroxide or the heat-treated particles. In this case, diffusion of lithium into the manganese-cobalt composite hydroxide or the heat-treated particles is satisfactorily performed by maintaining the lithium mixture at about the reaction temperature of lithium hydroxide or lithium carbonate so that a uniform lithium-manganese-cobalt composite oxide is obtained.

(Calcining Atmosphere)

An atmosphere during calcining is an oxidizing atmosphere whose oxygen concentration is preferably 18 vol % to 100 vol %, and is more preferably a mixed atmosphere of oxygen and an inert gas. More specifically, calcining is preferably performed in the air or an oxygen flow. If the oxygen concentration is less than 18 vol %, there is a possibility that the crystallinity of the resulting lithium-manganese-cobalt composite oxide is not satisfactory.

It is to be noted that a furnace for use in calcining is not particularly limited as long as the lithium mixture can be heated in the air or an oxygen flow. However, from the viewpoint of uniformly maintaining the atmosphere in the furnace, the furnace is preferably an electric furnace that does not generate gas, and may be either a batch-type furnace or a continuous-type furnace.

(Disintegration)

There is a case where aggregation or slight sintering of the lithium-manganese-cobalt composite oxide occurs due to calcining. In this case, disintegration may be performed to obtain a lithium-manganese-cobalt composite oxide, that is, a positive electrode active material.

It is to be noted that disintegration refers to an operation to apply mechanical energy to aggregations of secondary particles formed by sintering/necking between the secondary particles during calcining to separate the secondary particles from each other to loosen the aggregations without substantially breaking the secondary particles themselves. This makes it possible to obtain a lithium-manganese-cobalt composite oxide having a narrow particle size distribution while maintaining the structure of the secondary particles.

As described above, the process for producing the positive electrode active material includes a mixing step in which the manganese-cobalt composite hydroxide and a lithium compound are mixed to form a lithium mixture and a calcining step in which the lithium mixture is calcined at a temperature of 650° C. to 1000° C. in an oxidizing atmosphere, and therefore the above-described distinctive positive electrode active material can be obtained.

The process for producing the positive electrode active material is easy to perform, achieves high productivity, and is suitable for industrial-scale production, and therefore its industrial value is significantly high.

[3] Non-Aqueous Electrolyte Secondary Battery

A non-aqueous electrolyte secondary battery uses a positive electrode using the above-described positive electrode active material. First, the structure of the non-aqueous electrolyte secondary battery will be described.

A non-aqueous electrolyte secondary battery (hereinafter, simply referred to as a "secondary battery") according to an embodiment of the present invention has substantially the same structure as a common non-aqueous electrolyte secondary battery except that the above-described positive electrode active material is used as a positive electrode material, and therefore will be briefly described.

The secondary battery may have a generally-known structure such as a cylindrical type, a rectangular type, a coin type, or a button type. For example, when the secondary battery is of a cylindrical type, the secondary battery includes a case, and a positive electrode, a negative electrode, a non-aqueous electrolyte, and a separator housed in the case. More specifically, the secondary battery is formed in the following manner. A positive electrode and a negative electrode are stacked with a separator being interposed between them to form an electrode body, the obtained electrode body is impregnated with a non-aqueous electrolyte, a positive electrode current collector of the positive electrode and a negative electrode current collector of the negative electrode are connected to a positive electrode terminal connected to the outside and a negative electrode terminal connected to the outside, respectively, through a current collector lead or the like, and the case is hermetically sealed.

It goes without saying that the structure of the secondary battery is not limited to the above example, and the secondary battery may have various external shapes such as a cylindrical shape and a laminated shape.

(Positive Electrode)

The positive electrode is a sheet-shaped member formed by applying a positive electrode mixture paste containing the positive electrode active material onto the surface of a current collector formed from, for example, an aluminum foil and drying the applied positive electrode mixture paste. A product obtained by applying the positive electrode mixture paste onto the surface of a current collector and drying the applied positive electrode mixture paste is sometimes referred to as an "electrode film".

It is to be noted that the positive electrode is appropriately processed according to a battery in which the positive electrode is to be used. For example, the positive electrode is subjected to, for example, a cutting process to cut the positive electrode into an appropriate size according to a desired battery or a compressing process using a roll press or the like to increase an electrode density.

The positive electrode mixture paste is prepared by adding a solvent to a positive electrode mixture and kneading them. The positive electrode mixture is prepared by mixing the positive electrode active material in a power form, a conductive material, and a binder.

The conductive material is added to impart appropriately conductivity to the electrode. The conductive material is not particularly limited, but may be, for example, graphite (e.g., natural graphite, artificial graphite, and expanded graphite) or a carbon black-based material such as acetylene black or Ketjen black.

The binder plays a role in binding the positive electrode active material particles together. The binder for use in the positive electrode mixture is not particularly limited, but may be, for example, polyvinylidene fluoride (PVDF), polytetrafluoroethylene (PTFE), fluorine-containing rubber, ethylene propylene diene rubber, styrene butadiene, a cellulose-based resin, or polyacrylic acid.

It is to be noted that the positive electrode mixture may contain activated carbon. By adding activated carbon, it is possible to increase the electric double layer capacity of the positive electrode.

The solvent is used to dissolve the binder so that the positive electrode active material, the conductive material, the activated carbon, etc. are dispersed in the binder. The solvent is not particularly limited, but may be, for example, an organic solvent such as N-methyl-2-pyrrolidone.

Further, the mixing ratio among the materials contained in the positive electrode mixture paste is not particularly limited. For example, when the solid content of the positive electrode mixture except for the solvent is taken as 100 parts by mass, as in the case of the positive electrode of a common non-aqueous electrolyte secondary battery, a positive electrode active material content may be 60 parts by mass to 95 parts by mass, a conductive material content may be 1 part by mass to 20 parts by mass, and a binder content may be 1 part by mass to 20 parts by mass.

(Negative Electrode)

The negative electrode is a sheet-shaped member formed by applying a negative electrode mixture paste onto the surface of a metal foil current collector such as copper or the like and drying the applied negative electrode mixture paste. This negative electrode is formed in substantially the same manner as described with reference to the positive electrode except for the components or composition of the negative electrode mixture paste and the material of the current collector. Therefore, various processes are performed as in the case of the positive electrode, if necessary.

The negative electrode mixture paste is a paste obtained by adding an appropriate solvent to a negative electrode mixture prepared by mixing a negative electrode active material and a binder.

Examples of the negative electrode active material to be used include a substance containing lithium, such as a metal lithium or a lithium alloy, and an occlusion substance that can occlude and release lithium ions.

The occlusion substance to be used is not particularly limited, and examples thereof include natural graphite, artificial graphite, a calcined product of an organic compound such as a phenol resin, and a powdery carbonaceous substance such as coke. When such an occlusion substance is used as a negative electrode active material, as in the ease of the positive electrode, a fluorine-containing resin such as PVDF can be used as a binder, and an organic solvent such as N-methyl-2-pyrrolidone can be used as a solvent for dispersing the negative electrode active material in the binder.

(Separator)

The separator is interposed between the positive electrode and the negative electrode, and has the function of separating the positive electrode and the negative electrode from each other and holding an electrolyte. As such a separator, for example, a thin film made of polyethylene, polypropylene, or the like and having a plurality of micropores may be used. It is to be noted that the thin film is not particularly limited as long as it functions as a separator.

(Non-Aqueous Electrolyte)

The non-aqueous electrolyte is obtained by dissolving a lithium salt as a supporting salt in an organic solvent. Examples of the organic solvent include: a cyclic carbonate such as ethylene carbonate, propylene carbonate, butylene carbonate, or trifluoropropylene carbonate; a linear carbonate such as diethyl carbonate, dimethyl carbonate, ethyl methyl carbonate, or dipropyl carbonate; an ether compound such as tetrahydrofuran, 2-methyltetrahydrofuran, or dimethoxyethane; a sulfur compound such as ethylmethylsulfone or butanesultone; and a phosphorus compound such as triethyl phosphate or trioctyl phosphate. These organic solvents may be used singly or in combination of two or more of them.

Examples of the supporting salt to be used include $LiPF_6$, $LiBF_4$, $LiClO_4$, $LiAsF_6$, $LiN(CF_3SO_2)_2$, and a composite salt of two or more of them.

It is to be noted that the electrolytic solution may contain a radical scavenger, a surfactant, a flame retardant, or the like to improve battery characteristics.

(Battery Characteristics of Non-Aqueous Electrolyte Secondary Battery)

Since the secondary battery having the above-described structure has a positive electrode using the positive electrode active material having the above-described distinctive structure and characteristics, the area of contact between the positive electrode active material and the non-aqueous electrolyte is increased and the filling density of the positive electrode active material is increased. Therefore, even when using a thin electrode film, the secondary battery can achieve a high output characteristic, a high battery capacity, and a high electrode density. Therefore, the secondary battery can achieve a high initial discharge capacity, a low positive electrode resistance, a high capacity, and a high output while having a thin electrode film. Further, the secondary battery has a high volume energy density. Further, the secondary battery has higher heat stability and higher safety as compared to when a conventional lithium-manganese-cobalt-based oxide is used as a positive electrode active material.

(Applications of Secondary Battery)

The secondary battery has excellent battery characteristics, and is therefore suitable as a power source for compact mobile electronic devices (e.g., laptop personal computers or mobile phone units) that are always required to have a high capacity.

Further, the secondary battery is suitable also as a motor driving power source required to produce a high output. In general, a battery becomes difficult to secure safety as its size increases, which makes it inevitable for the battery to have an expensive protective circuit. However, the secondary battery is excellent in safety, which makes it possible not only to easily secure safety but also to simplify the expensive protective circuit to reduce its costs. Further, the secondary battery can be downsized and can achieve a high output, and is therefore suitable as a power source for transport machines whose battery-mounting space is limited.

EXAMPLES

Hereinbelow, the present invention will be more specifically described with reference to examples and comparative examples, but is not limited to these examples. In the examples, evaluations were made in the following manner. It is to be noted that unless other specified, samples of special grade reagents manufactured by Wako Pure Chemical Industries, Ltd. were used for production of a manganese-cobalt composite hydroxide, a positive electrode active material, and a secondary battery.

(1) Measurement of Volume-Average Particle Size and Particle Size Distribution

The volume-average particle size and the particle size distribution were evaluated based on measurement results using a laser diffraction-type particle size analyzer (manufactured by NIKKISO CO., LTD. under the trade name of Microtrac).

(2) External Appearance of Particles

The particles were observed with a scanning electron microscope (SEM) (manufactured by Hitachi High-Technologies Corporation under the trade name of S-4700). The aspect ratio was determined by measuring the aspect ratio of each of 20 particles randomly selected by SEM observation and calculating the average thereof. The average of maximum diameters of the plate-shaped primary particles was determined by measuring the maximum diameter of each of 50 particles randomly selected by SEM observation and calculating the average thereof.

(3) Analysis of Metal Components

A sample was dissolved, and then metal components were determined by ICP (Inductively Coupled Plasma) emission spectrometric analysis.

(4) Production and Evaluation of Battery (Battery for Evaluation)

Figure 4:
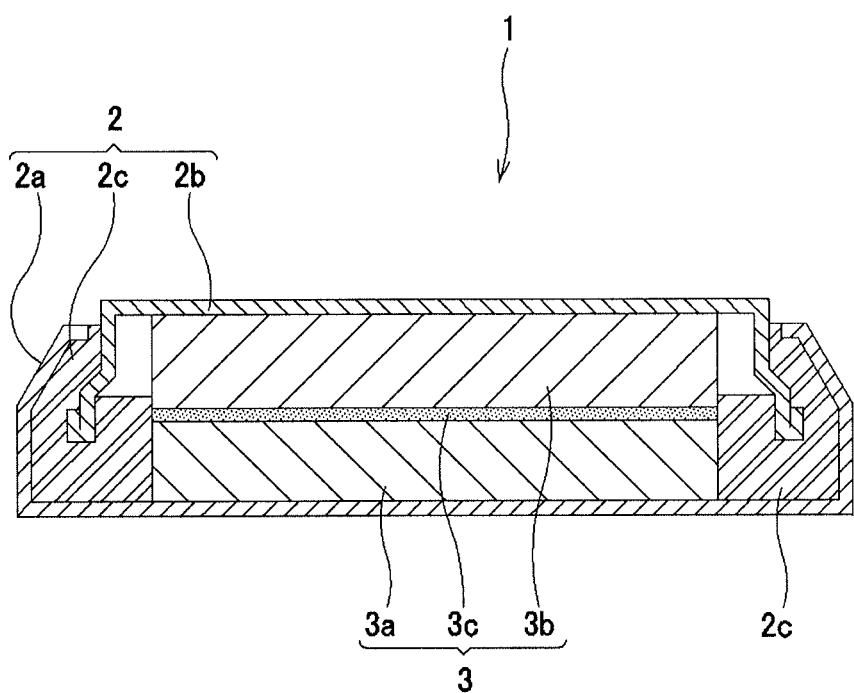
FIG. 4 illustrates a schematic sectional view of a coin-type battery used for battery evaluation.

A 2032-type coin battery (hereinafter, referred to as a "coin-type battery 1") shown in FIG. 4 was used. As shown in FIG. 4, the coin-type battery 1 includes a case 2 and an electrode 3 housed in the case 2. The case 2 includes a positive electrode can 2a that is hollow and has an opening at its one end and a negative electrode can 2b placed at the opening of the positive electrode can 2a. The case 2 is configured so that a space for housing the electrode 3 is formed between the negative electrode can 2b and the positive electrode can 2a by placing the negative electrode can 2b at the opening of the positive electrode can 2a. The electrode 3 includes a positive electrode 3a, a separator 3c, and a negative electrode 3b stacked on top of another in this order, and is housed in the case 2 so that the positive electrode 3a is in contact with the inner surface of the positive electrode can 2a and the negative electrode 3b is in contact with the inner surface of the negative electrode can 2b. It is to be noted that the case 2 includes a gasket 2c, and this gasket 2c fixes the positive electrode can 2a and the negative electrode can 2b to prevent relative movement between them to keep the positive electrode can 2a and the negative electrode can 2b in a non-contact state. Further, the gasket 2c also has the function of hermetically sealing a gap between the positive electrode can 2a and the negative electrode can 2b to air- and liquid-tightly cut off the inside of the case 2 from the outside.

(Production of Battery)

First, 52.5 mg of a positive electrode active material, 15 mg of acetylene black, and 7.5 mg of a polytetrafluoroethylene resin (PTFE) were mixed together, and the resulting mixture was press-molded at a pressure of 100 MPa to form a positive electrode 3a having a diameter of 11 mm and a thickness of 100 μm. The thus formed positive electrode 3a was dried at 120° C. for 12 hours in a vacuum drier. The above-described coin-type battery 1 was produced using the thus obtained positive electrode 3a, a negative electrode 3b, a separator 3c, and an electrolytic solution in an Ar-filled glove box whose dew point was controlled to be −80° C. It is to be noted that the negative electrode 3b used was a negative electrode sheet formed by applying a graphite powder having an average particle size of about 20 μm and polyvinylidene fluoride onto a copper foil and stamping the copper foil into a disk shape having a diameter of 14 mm. Further, the separator 3c used was a porous polyethylene film having a thickness of 25 μm. The electrolytic solution used was a mixture containing ethylene carbonate (EC) and diethyl carbonate (DEC) in equal proportions and 1 M of $LiClO_4$ as a supporting electrolyte (manufactured by TOMIYAMA PURE CHEMICAL INDUSTRIES, Ltd.).

(Initial Discharge Capacity)

After the completion of production of the coin-type battery 1, the coin-type battery 1 was allowed to stand for about 24 hours. After the open circuit voltage (OCV) of the coin-type battery 1 was stabilized, the coin-type battery 1 was charged up to a cut-off voltage of 4.3 V at a current density on the positive electrode 3a of 0.1 mA/cm², and then after a suspension for 1 hour, the coin-type battery 1 was discharged down to a cut-off voltage of 3.0 V to determine a capacity, and the capacity was defined as an initial discharge capacity.

(Cycle Capacity Maintenance Rate)

The coin-type battery 1 was charged up to 4.2 V at a current density on the positive electrode of 2 mA/cm² and discharged down to 3.0 V, and this cycle was repeated 200 times to determine a discharge capacity after repeated charge-discharge cycles. Then, the ratio of the discharge capacity and the initial discharge capacity was calculated as a capacity maintenance rate. The charge/discharge capacity of the coin-type battery 1 was measured using a multichannel voltage/current generator (R6741A manufactured by ADVANTEST CORPORATION).

(Rate Characteristic)

The rate characteristic of the coin-type battery 1 was evaluated based on a discharge capacity maintenance rate at the time when a discharge rate was increased from 0.2 C to 5 C.

Example 1

[Nucleation Step]

In Example 1, cobalt sulfate heptahydrate (Co molarity: 1.38 mol/L) and 900 mL of pure water were placed in a crystallization reaction vessel having a capacity of 5 L and equipped with 4 baffle plates, and were heated at 60° C. by a thermostatic tank and a heating jacket while being stirred at a rotation speed of 1000 rpm with an inclined paddle with 6 blades to obtain an aqueous solution before reaction. Nitrogen gas was allowed to flow into the reaction vessel to produce a nitrogen atmosphere. At this time, the concentration of oxygen in the inner space of the reaction vessel was 1.0%. A 6.25 mass % aqueous sodium hydroxide solution was supplied at 42 mL/min to increase the pH of the aqueous solution before reaction to 13 on the basis of a liquid temperature of 25° C., and then the aqueous solution before reaction was continuously stirred for 30 minutes to obtain a plate-shaped crystal nuclei-containing slurry.

[Particle Growth Step]

In Example 1, an aqueous solution containing nickel sulfate (Ni molarity: 0.40 mol/L) and cobalt sulfate (Co molarity: 0.20 mol/L), and manganese sulfate (Mn molarity: 1.40 mol/L) was prepared as a mixed aqueous solution. As in the case of the nucleation step, 25 mass % ammonia water was added to the plate-shaped crystal nuclei-containing slurry in a nitrogen atmosphere so that the concentration of ammonia in the vessel was 10 g/L, and a 64 mass % aqueous sulfuric acid solution was further added to adjust the pH of the slurry to 11.6 on the basis of a liquid temperature of 25° C. to obtain a slurry for particle growth. The mixed aqueous solution was supplied to the slurry for particle growth at 12.9 mL/min while 25 mass % ammonia water as a complexing agent and a 25 mass % aqueous sodium hydroxide solution were supplied thereto so that the concentration of ammonia was 10 g/L and the pH of the slurry was controlled to be kept at 11.6 on the basis of a liquid temperature of 25° C. to form a composite hydroxide. Then, the composite hydroxide was washed with water, filtered, and dried at 120° C. for 24 hours in an air atmosphere. The thus obtained composite hydroxide had a composition of $Ni_{0.20}Co_{0.10}Mn_{0.70}(OH)_2$. Further, the volume-average particle size (Mv) was 10.6 μm and the particle size variation index represented by [(D90–D10)/Mv] was 0.65.

Figure 5:
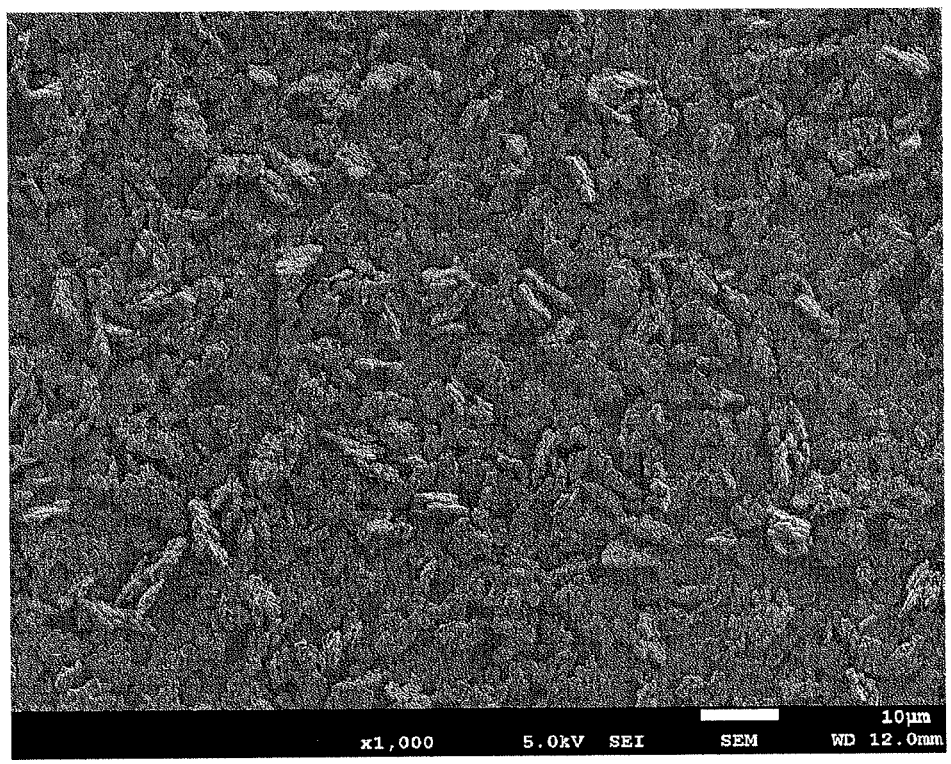
FIG. 5 is a scanning electron micrograph (observation magnification: 1000 times) of a manganese-cobalt composite hydroxide obtained in Example 1.

The result of SEM observation in Example 1 is shown in FIG. 5. The aspect ratio measured by SEM observation was 6.3, and the average of maximum diameters of the plate-shaped primary particles projected in a direction perpendicular to the plate surfaces thereof (maximum diameters of plate-shaped primary particles projected in a direction perpendicular to the plate surfaces of the secondary particles) was 2.7 μm. Further, the cross-section of the obtained lithium-manganese-cobalt composite hydroxide (secondary particles) was analyzed with an energy dispersive X-ray analyzer. As a result, it was found that the secondary particles had a cobalt-containing high concentration layer formed in the center of their width direction, and the high concentration layer had an average thickness of 0.5 μm.

[Production of Positive Electrode Active Material]

In Example 1, the obtained composite hydroxide and lithium hydroxide weighed to achieve a ratio Li/Me of 1.50 were mixed to form a lithium mixture. The mixing was performed using a shaker mixer (TURBULA Type t2C manufactured by Willy A. Bachofen (WAB)).

In Example 1, the obtained lithium mixture was calcined at 900° C. for 5 hours in the flow of air, cooled, and then disintegrated to obtain a positive electrode active material. The obtained positive electrode active material was confirmed to include hexagonal $LiMeO_2$ and monoclinic $Li_2Me'O_3$ by analysis with an X-ray diffractometer (X'Pert PRO manufactured by PANalytical). Further, the orientation index of (003) plane determined from an X-ray diffraction waveform was 0.97, and the site occupancy of metal ions other than lithium in a $3a$ site determined by Rietveld analysis was 2.5%. Further, a 2032-type coin battery (coin-type battery 1) was produced to evaluate its initial discharge capacity, cycle capacity maintenance rate, and rate characteristic.

Example 2

In Example 2, a composite hydroxide was obtained in the same manner as in Example 1 except that a composite solution of nickel sulfate (Ni molarity: 0.8 mol/L), cobalt sulfate (Co molarity: 0.2 mol/L), and manganese sulfate (Mn molarity: 1.0 mol/L) was used as the mixed aqueous solution used in the particle growth step in Example 1. The obtained composite hydroxide had a volume-average particle size (Mv) of secondary particles of 11.2 μm, the aspect ratio was 5.4, and the average of maximum diameters of the plate-shaped primary particles projected in a direction perpendicular to the plate surfaces thereof was 1.5 μm.

Example 3

In Example 3, a composite hydroxide was obtained in the same manner as in Example 1 except that a composite solution of nickel sulfate (Ni molarity: 0.4 mol/L), cobalt sulfate (Co molarity: 0.8 mol/L), and manganese sulfate (Mn molarity: 0.8 mol/L) was used as the mixed aqueous solution used in the particle growth step in Example 2. The obtained composite hydroxide had a volume-average particle size (Mv) of secondary particles of 10.9 the aspect ratio was 7.0, and the average of maximum diameters of the plate-shaped primary particles projected in a direction perpendicular to the plate surfaces thereof was 3.3 μm.

Example 4

In Example 4, a composite hydroxide was obtained in the same manner as in Example 1 except that the pH in the nucleation step in Example 1 was changed to 13.7 on the basis of a liquid temperature of 25° C. The obtained composite hydroxide had a volume-average particle size (Mv) of secondary particles of 8.7 μm, the aspect ratio was 13.2, and the average of maximum diameters of the plate-shaped primary particles projected in a direction perpendicular to the plate surfaces thereof was 2.4 μm.

Example 5

In Example 5, a composite hydroxide was obtained in the same manner as in Example 1 except that the pH in the particle growth step in Example 1 was changed to 10.7 on the basis of a liquid temperature of 25° C. The obtained composite hydroxide had a volume-average particle size (Mv) of secondary particles of 13.7 µm, the aspect ratio was 5.8, and the average of maximum diameters of the plate-shaped primary particles projected in a direction perpendicular to the plate surfaces thereof was 3.8 µm.

Example 6

In Example 6, a composite hydroxide was obtained in the same manner as in Example 1 except that the concentration of oxygen in the inner space of the reaction vessel in Example 1 was changed to 3.0%. The obtained composite hydroxide had a volume-average particle size (Mv) of secondary particles of 10.3 µm, the aspect ratio was 4.0, and the average of maximum diameters of the plate-shaped primary particles projected in a direction perpendicular to the plate surfaces thereof was 2.7 µm.

Example 7

In Example 7, a composite hydroxide was obtained in the same manner as in Example 1 except that the concentration of ammonia in the particle growth step was changed to 15 g/L. The obtained composite hydroxide had a volume-average particle size (Mv) of secondary particles of 10.4 µm, the aspect ratio was 5.6, and the average of maximum diameters of the plate-shaped primary particles projected in a direction perpendicular to the plate surfaces thereof was 2.6 µm.

Comparative Example 1

In Comparative Example 1, a composite hydroxide was obtained in the same manner as in Example 1 except that the pH in the nucleation step in Example 1 was changed to 12.0 on the basis of a liquid temperature of 25° C. The obtained composite hydroxide had a volume-average particle size (Mv) of secondary particles of 11.3 µm, the aspect ratio was 2.5, and the average of maximum diameters of the plate-shaped primary particles projected in a direction perpendicular to the plate surfaces thereof was 1.6 µm.

Comparative Example 2

In Comparative Example 2, a composite hydroxide was obtained in the same manner as in Example 1 except that the pH in the particle growth step in Example 1 was changed to 12.7 on the basis of a liquid temperature of 25° C. The obtained composite hydroxide had a volume-average particle size (Mv) of secondary particles of 6.7 µm, the aspect ratio was 2.1, and the average of maximum diameters of the plate-shaped primary particles projected in a direction perpendicular to the plate surfaces thereof was 0.8 µm.

Comparative Example 3

In Comparative Example 3, a composite hydroxide was obtained in the same manner as in Example 1 except that the atmosphere in the inner space of the reaction vessel in Example 1 was changed to an air atmosphere. The obtained composite hydroxide had a volume-average particle size (Mv) of secondary particles of 3.4 µm, the aspect ratio was 1.3, and the average of maximum diameters of the plate-shaped primary particles projected in a direction perpendicular to the plate surfaces thereof was 0.4 µm.

Comparative Example 4

In Comparative Example 4, a composite hydroxide was obtained in the same manner as in Example 1 except that the concentration of ammonia in the particle growth step was changed to 3 g/L. The obtained composite hydroxide had a volume-average particle size (Mv) of secondary particles of 7.8 µm, the aspect ratio was 2.5, and the average of maximum diameters of the plate-shaped primary particles projected in a direction perpendicular to the plate surfaces thereof was 2.0 µm.

[Evaluations]

The volume-average particle size (Mv), the aspect ratio, the average of maximum diameters of plate-shaped primary particles projected in a direction perpendicular to the plate surfaces thereof, and the composition ratio were evaluated in the same manner as those of the composite hydroxide, and the evaluation results thereof are shown in Table 1.

The volume-average particle size (Mv), the aspect ratio, the composition ratio, the non-lithium ion mix ratio in $3a$ site, and the (003) plane orientation index evaluated in the same manner as those of the composite hydroxide are shown in Table 1, and the evaluation results of each of the batteries are shown in Table 2.

In each of Example 1 to Example 7, a lithium-manganese-cobalt composite hydroxide was obtained through a nucleation step in which pH was adjusted to 12.5 or more on the basis of a liquid temperature of 25° C. to form plate-shaped crystal nuclei and a particle growth step in which a slurry for particle growth containing the plate-shaped crystal nuclei formed in the nucleation step was adjusted to a pH of 10.5 to 12.5 on the basis of a liquid temperature of 25° C. but less than the pH in the nucleation step, and a mixed aqueous solution containing at least a manganese-containing metal compound is supplied to the slurry for particle growth to grow the plate-shaped crystal nuclei. Further, in the nucleation step, nucleation was performed in a non-oxidizing atmosphere whose oxygen concentration was 5 vol % or less, and in the particle growth step, the concentration of ammonia in the slurry for particle growth was adjusted to 5 g/L to 20 g/L.

The thus obtained lithium-manganese-cobalt composite hydroxide had an aspect ratio of 3 to 20, a volume-average particle size (Mv) as measured by a laser diffraction scattering method of 4 µm to 20 µm, and a particle size variation index represented by [(D90−D10)/Mv] of 0.75 or less. A plate-shaped Li-excess lithium composite oxide formed using the composite hydroxide as a precursor had the same aspect ratio and the volume-average particle size as those of the composite hydroxide. The coin battery using the Li-excess lithium composite oxide as a positive electrode active material was found to be excellent in battery characteristics (initial discharge capacity, cycle capacity maintenance rate, and rate characteristic).

In Example 3, the amount of Mn was smaller, and therefore the battery capacity was lower than those of other examples according to the composition, but a high output characteristic and a high cycle characteristic were achieved due to the structure of the particles. Further, in Example 4, the pH in the nucleation step was higher and the aspect ratio was higher, and therefore a higher output characteristic was achieved but the cycle characteristic was slightly lower. On the other hand, in Example 6, the aspect ratio was lower, and therefore the output characteristic was higher than those of Comparative Examples but slightly lower than those of other Examples.

On the other hand, in each of Comparative Example 1 to Comparative Example 4, one of the production conditions of the Li-excess lithium composite oxide was not satisfied, and therefore the obtained Li-excess lithium composite oxide did not satisfy an aspect ratio of 3 to 20 and/or a volume-average particle size of 4 μm to 20 μm. Further, each of the coin batteries using the obtained Li-excess lithium composite oxide as a positive electrode active material was found to be poor in battery characteristics, especially an output characteristic and a cycle characteristic.

TABLE 1

| | Volume-average particle size (μm) | Aspect ratio | Average of maximum diameters of primary particles (μm) | Composition ratio | Non-lithium ion mix ratio in 3a site (%) | (003) plane orientation index |
|---|---|---|---|---|---|---|
| Example 1 | 10.6 | 6.3 | 2.7 | $Li_{1.51}Ni_{0.20}Co_{0.10}Mn_{0.70}(OH)_2$ | 2.5 | 0.97 |
| Example 2 | 11.2 | 5.4 | 1.5 | $Li_{1.51}Ni_{0.40}Co_{0.10}Mn_{0.50}(OH)_2$ | 2.7 | 1.01 |
| Example 3 | 10.9 | 7.0 | 3.3 | $Li_{1.51}Ni_{0.20}Co_{0.40}Mn_{0.40}(OH)_2$ | 2.6 | 0.96 |
| Example 4 | 8.7 | 10.2 | 2.4 | $Li_{1.51}Ni_{0.20}Co_{0.10}Mn_{0.70}(OH)_2$ | 2.1 | 0.94 |
| Example 5 | 13.7 | 5.8 | 3.8 | $Li_{1.51}Ni_{0.20}Co_{0.10}Mn_{0.70}(OH)_2$ | 3.1 | 0.99 |
| Example 6 | 10.3 | 4.0 | 2.7 | $Li_{1.51}Ni_{0.20}Co_{0.10}Mn_{0.70}(OH)_2$ | 2.5 | 1.01 |
| Example 7 | 10.4 | 5.6 | 2.6 | $Li_{1.51}Ni_{0.20}Co_{0.10}Mn_{0.70}(OH)_2$ | 2.7 | 1.01 |
| Comparative Example 1 | 11.3 | 2.5 | 1.6 | $Li_{1.51}Ni_{0.20}Co_{0.10}Mn_{0.70}(OH)_2$ | 2.9 | 1.01 |
| Comparative Example 2 | 6.7 | 2.1 | 0.8 | $Li_{1.51}Ni_{0.20}Co_{0.10}Mn_{0.70}(OH)_2$ | 2.4 | 1.03 |
| Comparative Example 3 | 3.4 | 1.3 | 0.4 | $Li_{1.51}Ni_{0.20}Co_{0.10}Mn_{0.70}(OH)_2$ | 3.0 | 1.15 |
| Comparative Example 4 | 7.8 | 2.5 | 2.0 | $Li_{1.51}Ni_{0.20}Co_{0.10}Mn_{0.70}(OH)_2$ | 2.8 | 1.08 |

TABLE 2

| | Initial discharge capacity (mAh/g) | Discharge capacity for 5 C/discharge capacity for 0.2 C (%) | Capacity maintenance rate after 200 cycles (%) |
|---|---|---|---|
| Example 1 | 261 | 40.7 | 64 |
| Example 2 | 211 | 39.4 | 58 |
| Example 3 | 170 | 38.8 | 66 |
| Example 4 | 250 | 43.4 | 61 |
| Example 5 | 260 | 38.5 | 63 |
| Example 6 | 260 | 35.7 | 62 |
| Example 7 | 258 | 36.5 | 64 |
| Comparative Example 1 | 255 | 29.3 | 57 |
| Comparative Example 2 | 256 | 23.4 | 58 |
| Comparative Example 3 | 254 | 19.9 | 51 |
| Comparative Example 4 | 257 | 28.1 | 55 |

GLOSSARY OF DRAWING REFERENCES

1 . . . coin-type battery, 2 . . . case, 2a . . . positive electrode can, 2b . . . negative electrode can, 2c . . . gasket, 3 . . . electrode, 3a . . . positive electrode, 3b . . . negative electrode, 3c . . . separator

The invention claimed is:

1. A manganese-cobalt composite hydroxide represented by $Ni_xCo_yMn_zM_t(OH)_{2+A}$ (wherein x satisfies 0<x<0.5, y satisfies 0<y<0.5, z satisfies 0.35<z<0.8, t satisfies 0<t<0.1, A satisfies 0<A<0.5, x, y, z, and t satisfy x+y+z+t=1, and M is at least one additive element selected from V, Mg, Al, Ti, Mo, Nb, Zr, and W), the composite hydroxide comprising:
plate-shaped secondary particles each obtained by aggregation of a plurality of plate-shaped primary particles caused by overlapping of plate surfaces of the plate-shaped primary particles,
wherein a shape of the plate-shaped primary particles projected in a direction perpendicular to the plate surfaces thereof is any one of a spherical shape, an elliptical shape, an oval shape, and a planar projected shape of a block-shaped object, and the secondary particles have an aspect ratio of 3 to 20 and a volume-average particle size (Mv) of 4 μm to 20 μm as measured by a laser diffraction scattering method,
at least a cobalt concentration layer is provided inside the plate-shaped primary particles at the center of a thickness direction of the plate-shaped primary particles, and
the cobalt concentration layer has a thickness in a range of 0.01 μm to 1 μm, and the manganese-cobalt composite hydroxide is a precursor used to produce a positive electrode active material.

2. The manganese-cobalt composite hydroxide according to claim 1, wherein a particle size variation index represented by [(D90–D10)/Mv] is 0.70 or less, which is calculated from D90 and D10 of a particle size distribution determined by a laser diffraction scattering method and the volume-average particle size (Mv).

3. The manganese-cobalt composite hydroxide according to claim 1, wherein an average of maximum diameters of the plate-shaped primary particles projected in a direction perpendicular to plate surfaces of the secondary particles is 1 μm to 5 μm.

4. A process for producing a positive electrode active material for non-aqueous electrolyte secondary batteries comprising a lithium-manganese-cobalt composite oxide represented by $Li_{1+u}Ni_xCo_yMn_zM_tO_{2+\alpha}$ (wherein u satisfies −0.05≤u<0.60, x satisfies 0≤x≤0.5, y satisfies 0<y≤0.5, z satisfies 0.35<z<0.8, t satisfies 0≤t≤0.1, α satisfies 0≤α<0.6, x, y, z, and t satisfy x+y+z+t=1, and M is at least one additive element selected from V, Mg, Al, Ti, Mo, Nb, Zr, and W) and having a hexagonal layered structure, the process comprising:
a mixing step in which the manganese-cobalt composite hydroxide according to claim 1 and a lithium compound are mixed to form a lithium mixture; and
a calcining step in which the lithium mixture is calcined at a temperature of 650° C. to 1000° C. in an oxidizing atmosphere.

5. The process for producing a positive electrode active material for non-aqueous electrolyte secondary batteries according to claim 4, wherein, a ratio (Li/ME) of a number of lithium atoms (Li) to a total number of metal atoms other than lithium (ME) contained in the lithium mixture is 0.95 to 1.6.

6. The process for producing a positive electrode active material for non-aqueous electrolyte secondary batteries according to claim 4, further comprising, before the mixing step, a heat treatment step in which the manganese-cobalt composite hydroxide is heat-treated at a temperature of 300° C. to 750° C. in a non-reducing atmosphere.

7. The process for producing a positive electrode active material for non-aqueous electrolyte secondary batteries according to claim 4, wherein the oxidizing atmosphere in the calcining step is an atmosphere containing 18 vol % to 100 vol % of oxygen.

* * * * *